(12) United States Patent
Choi et al.

(10) Patent No.: US 12,487,156 B2
(45) Date of Patent: Dec. 2, 2025

(54) DEVICE AND METHOD FOR THE THERMO-ELECTRO- MECHANICAL CHARACTERIZATION OF MICROSCALE WIRES

(71) Applicants: Wonjune Choi, Tempe, AZ (US); Maxwell Kulak, Mesa, AZ (US); Wonmo Kang, Scottsdale, AZ (US)

(72) Inventors: Wonjune Choi, Tempe, AZ (US); Maxwell Kulak, Mesa, AZ (US); Wonmo Kang, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 340 days.

Patent file contains an affidavit/declaration under 37 CFR 1.130(b).

(21) Appl. No.: 18/451,746

(22) Filed: Aug. 17, 2023

(65) Prior Publication Data
US 2024/0272052 A1    Aug. 15, 2024

Related U.S. Application Data

(60) Provisional application No. 63/399,942, filed on Aug. 22, 2022.

(51) Int. Cl.
*G01N 3/08* (2006.01)
*G01N 3/06* (2006.01)

(52) U.S. Cl.
CPC ............... *G01N 3/08* (2013.01); *G01N 3/068* (2013.01); *G01N 2203/0017* (2013.01);
(Continued)

(58) Field of Classification Search
CPC .. G01N 3/08; G01N 3/068; G01N 2203/0017; G01N 2203/0051;
(Continued)

(56) References Cited

U.S. PATENT DOCUMENTS

| | | | | |
|---|---|---|---|---|
| 2011/0317157 | A1* | 12/2011 | Kang | B81C 99/005 356/244 |
| 2021/0262783 | A1* | 8/2021 | Kang | G01B 11/16 |
| 2023/0026439 | A1* | 1/2023 | Bustos | G01N 11/00 |

OTHER PUBLICATIONS

Choi et al., "Electro-thermo-mechanical characterization of microscale Ti-6Al-4V wires using an innovative experimental method", Materials Characterization, vol. 188, Jun. 2022 <https://doi.org/10.1016/j.matchar.2022.111927> (Year: 2022).*

* cited by examiner

*Primary Examiner* — Jonathan M Dunlap
(74) *Attorney, Agent, or Firm* — Fuller IP Law LLC; Rodney J. Fuller

(57) ABSTRACT

A method and device for electro-thermo-mechanical tensile testing of wires is disclosed. The device includes a sample frame having upper and lower parts, with the upper part coupled to the lower part through a plurality of sacrificial supports, the upper and lower parts each having an electrical contact pad. The upper and lower parts are electrically non-conductive. The device also includes a wire sample with tracking beads, the wire sample affixed to the upper and lower parts such that the electrical contact pads of the upper and lower parts are communicatively coupled through the wire sample. The device also includes a piezo actuator coupled to the upper part, a weight coupled to the lower part, a power supply configured to pass a current through the wire sample, an electronic balance beneath the weight, and a digital camera pointed at the tracking beads of the wire sample.

20 Claims, 27 Drawing Sheets

(52) U.S. Cl.
CPC ............... *G01N 2203/0051* (2013.01); *G01N 2203/0075* (2013.01); *G01N 2203/028* (2013.01); *G01N 2203/0647* (2013.01); *G01N 2203/0676* (2013.01)

(58) Field of Classification Search
CPC ..... G01N 2203/0075; G01N 2203/028; G01N 2203/0647; G01N 2203/0676
See application file for complete search history.

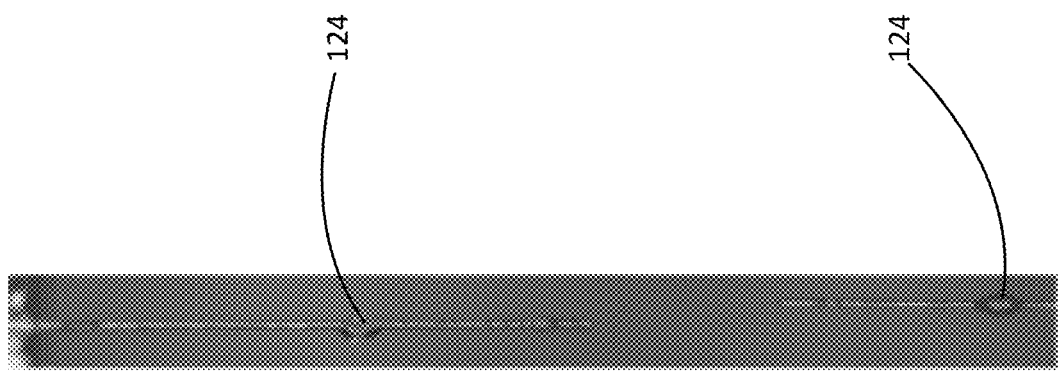

| Sample | Ti-6Al-4V (at.%) wires with different electric current | | | |
|---|---|---|---|---|
| | Ref [1, 2] | 0 A/mm² | 10 A/mm² | 20 A/mm² |
| Elastic modulus (GPa) | 104–113 | 104.0 | 98.7 | 77.6 |
| Yield strength (0.2% offset, MPa) | 880–920 | 913.8 | 846.5 | 758.7 |
| Ultimate tensile strength (MPa) | 900–950 | 1075.6 | 1003.0 | 910.9 |
| Failure Strength (MPa) | - | 1070.7 | 991.1 | 910.7 |
| Maximum elongation (%) | 5–18 | 9.26 | 10.285 | 11.37 |

FIG. 10

| Mechanical property | Temperature | | Reduction ratio (%) | Ref |
|---|---|---|---|---|
| | (near the room temperature) | (increased temperature) | | |
| Yield strength (MPa) | 913.50 (at 25 °C) | 747.23 (at 220 °C) | 81.80 | Present work |
| | 920 (at 20 °C) | 750 (at 200 °C) | 81.52 | [8] |
| | 917 (at 20 °C) | 717 (at 200 °C) | 78.19 | [9] |
| | 862 (at 20 °C) | 634 (at 200 °C) | 73.55 | [9] |
| | 1000 (at 23 °C) | 630 (at 260 °C) | 63.00 | [10] |
| Ultimate tensile strength | 960 (at 20 °C) | 880 (at 150 °C) | 91.67 | [11] |
| | 1046.85 (at 25 °C) | 919.43 (at 220 °C) | 87.83 | Present work |
| | 945 (at 20 °C) | 830 (at 200 °C) | 87.83 | [12] |
| | 917 (at 20 °C) | 772 (at 200 °C) | 84.19 | [9] |
| | 1020 (at 20 °C) | 827 (at 200 °C) | 81.08 | [9] |
| | 960 (at 20 °C) | 760 (at 300 °C) | 79.17 | [11] |
| Elastic modulus (GPa) | 125 (at 23 °C) | 110 (at 260 °C) | 88.00 | [13] |
| | 109 (at 20 °C) | 94 (at 200 °C) | 86.24 | [8] |
| | 125 (at 23 °C) | 100 (at 260 °C) | 80.00 | [10] |
| | 103.30 (at 25 °C) | 82.30 (at 220 °C) | 79.67 | Present work |

FIG. 13

DEVICE AND METHOD FOR THE THERMO-ELECTRO- MECHANICAL CHARACTERIZATION OF MICROSCALE WIRES

RELATED APPLICATIONS

This application claims the benefit of U.S. provisional patent application 63/399,942, filed Aug. 22, 2022, titled "Device and Method for the Thermo-Electro-Mechanical Characterization of Microscale Wires," the entirety of the disclosure of which is hereby incorporated by this reference.

STATEMENT REGARDING FEDERALLY SPONSORED RESEARCH

This invention was made with government support under N00014-21-1-2396 awarded by the Office of Naval Research. The government has certain rights in the invention.

TECHNICAL FIELD

Aspects of this document relate generally to electro-thermo-mechanical characterization of wires.

BACKGROUND

Electrically assisted deformation (EAD) increases the formability of a conductive workpiece by applying an electrical current during mechanical deformation. It could offer attractive advantages for processing metals with limited ductility, such as pure titanium and its alloys. Electrically assisted deformation achieves improved manufacturability [1] through the reduction of yield strength, flow stress, and springback [2] while achieving a larger strain to failure [3].

Despite many studies and its commercial use in manufacturing sectors, there are still disagreements on the underlying mechanisms of EAD, in particular with respect to distinguishing between thermal and athermal effects [4]. Exploring these effects will require improved devices and methods for characterizing materials that have undergone EAD, and the ability to differentiate the mechanisms behind these effects.

SUMMARY

According to one aspect, an electro-thermo-mechanical tensile testing device for wires includes a sample frame having an upper part and a lower part, with the upper part coupled to the lower part through a plurality of sacrificial supports that are integral with the upper part and the lower part. The upper part and the lower part each have an electrical contact pad and at least one protrusion. The upper part and the lower part are electrically non-conductive, and the sample frame is 3d printed. The device also includes a wire sample having a plurality of tracking beads. The wire sample is affixed to the upper part and the lower part such that the electrical contact pad of the upper part is communicatively coupled to the electrical contact pad of the lower part through the wire sample, with the wire sample wrapped around at least one protrusion on each of the upper part and the lower part. The device further includes a piezo actuator coupled to the upper part, a weight of known mass coupled to the lower part, and a dc power supply communicatively coupled to the wire sample through the electrical contact pads of the upper part and the lower part. The dc power supply is configured to pass a current through the wire sample. The device includes an electronic balance positioned beneath the weight, with the weight resting on the electronic balance, and a digital camera pointed at the wire sample within the sample frame such that the tracking beads on the wire sample are visible. The digital camera and the electronic balance are configured such that images are captured and weight measurements are recorded simultaneously, at regular intervals, while testing is being performed.

Particular embodiments may comprise one or more of the following features. The device may further include a first vessel containing water. The first vessel may be positioned on top of the electronic balance. The device may include a second vessel placed on the water inside the first vessel. The weight may be sitting on the second vessel, floating on the water of the first vessel, self-aligning with the sample frame and/or eliminating unwanted horizontal forces. The wire sample may be affixed to the sample frame with an adhesive. The device may further include a box enclosing the piezo actuator, the electronic balance, and the sample frame.

According to another aspect of the disclosure, an electro-thermo-mechanical tensile testing device for wires includes a sample frame having an upper part and a lower part, with the upper part coupled to the lower part through a plurality of sacrificial supports. The upper part and the lower part each have an electrical contact pad. The upper part and the lower part are electrically non-conductive. The device also includes a wire sample having a plurality of tracking beads. The wire sample is affixed to the upper part and the lower part such that the electrical contact pad of the upper part is communicatively coupled to the electrical contact pad of the lower part through the wire sample. The device further includes a piezo actuator coupled to the upper part, a weight of known mass coupled to the lower part, and a dc power supply communicatively coupled to the wire sample through the electrical contact pads of the upper part and the lower part. The dc power supply is configured to pass a current through the wire sample. The device includes an electronic balance positioned beneath the weight, with the weight resting on the electronic balance, and a digital camera pointed at the wire sample within the sample frame such that the tracking beads on the wire sample are visible.

Particular embodiments may comprise one or more of the following features. The device may further include a first vessel containing water. The first vessel may be positioned on top of the electronic balance. The device may include a second vessel placed on the water inside the first vessel. The weight may be sitting on the second vessel, floating on the water of the first vessel, self-aligning with the sample frame and/or eliminating unwanted horizontal forces. The upper part and the lower part may each comprise at least one protrusion around which the wire sample may be wrapped. The wire sample may be affixed to the sample frame with an adhesive. The sacrificial supports may be integral with the upper part and the lower part of the sample frame. The sample frame may be 3d printed. The wire sample may be communicatively coupled to the electrical contact pads through a conductive paste. The device may further include a box enclosing the piezo actuator, the electronic balance, and the sample frame.

According to yet another aspect of the disclosure, a method for the thermo-electro-mechanical characterization of wires includes affixing a wire sample to a sample frame, the sample frame having a plurality of sacrificial supports connecting an upper part of the sample frame with a lower part of the sample frame. The upper part and the lower part are each electrically non-conductive and each have an electrical contact pad. The wire sample is affixed to the sample frame such that the electrical contact pad of the upper part is communicatively coupled to the electrical contact pad of the lower part through the wire sample. The method also includes coupling the upper part of the sample frame to a piezo actuator above the sample frame, coupling the lower part of the sample frame to a weight of known mass below the sample frame, the weight located on an electronic balance, and communicatively coupling the wire sample to a dc power supply through the electrical contact pads of the sample frame. The method includes destroying the sacrificial supports, making the wire sample the only connection between the upper part and the lower part. The method also includes applying a desired current to the wire sample using the dc power supply, waiting for thermal changes in the wire sample due to joule heating from the applied current to reach a steady state, and applying a force on the wire sample by displacing the upper part of the sample frame upward using the piezo actuator. The method includes simultaneously capturing images of tracking beads on the wire sample with a digital camera and weight measurements from the electronic balance, at regular intervals while the upper part is being displaced upward, until the wire sample fails. Finally, the method includes determining stress values and strain values using the captured images and weight measurements.

Particular embodiments may comprise one or more of the following features. Destroying the sacrificial supports may include melting the sacrificial supports. The upper part and the lower part may each include at least one protrusion. Affixing the wire sample to the sample frame may include wrapping the wire sample around at least one protrusion on each of the upper part and the lower part of the sample frame. The method may further include fabricating the sample frame using 3d printing, with the sacrificial supports made integral with the upper part and the lower part. The weight of known mass being coupled to the lower part of the sample frame may be sitting in a second vessel. The second vessel may be floating on water contained in a first vessel. The first vessel may be located on top of the electronic balance, such that the weight self-aligns with the sample frame, eliminating unwanted horizontal forces. Affixing the wire sample to the sample frame may include bonding the wire sample to the upper part and the lower part with an adhesive. Affixing the wire sample to the sample frame may include communicatively coupling the wire sample to the electrical contact pads using a conductive paste. Determining the strain values may include using digital image correlation.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 8A-8F are photographs of a Ti-6Al-4V wire at various stages of testing in an ETM device;

FIG. 10 is a table of mechanical properties of Ti-6Al-4V;

FIG. 13 is a table comparing results from the contemplated ETM device with previous studies of Ti-6Al-4V.

DETAILED DESCRIPTION

Figure 1A:
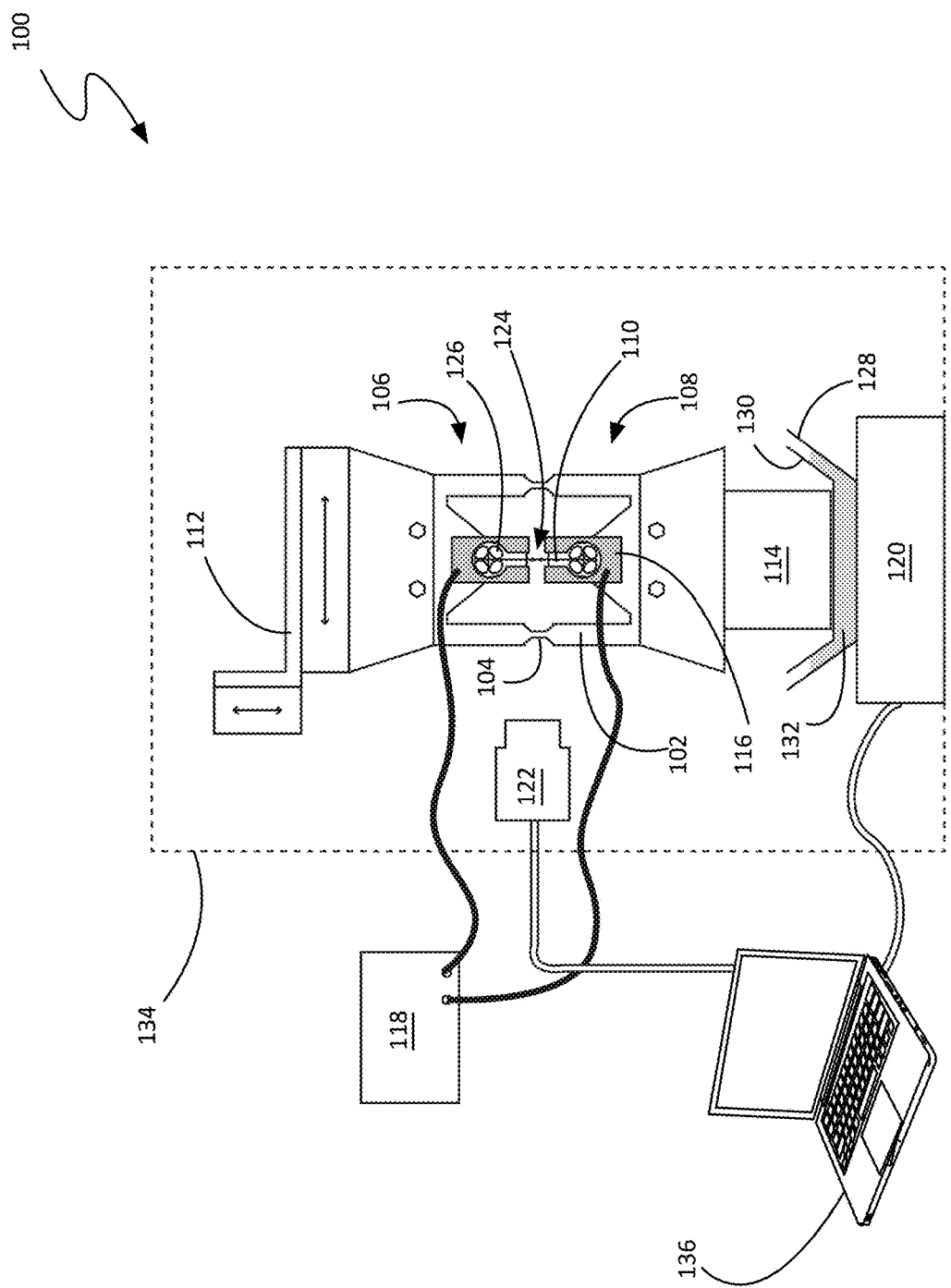
FIGS. 1A and 1B are schematic views of an electro-thermo-mechanical (ETM) tensile testing device before and during testing, respectively.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Electrically assisted deformation (EAD) increases the formability of a conductive workpiece by applying an electrical current during mechanical deformation. It could offer attractive advantages for processing metals with limited ductility, such as pure titanium and its alloys. Electrically assisted deformation achieves improved manufacturability [1] through the reduction of yield strength, flow stress, and springback [2] while achieving a larger strain to failure [3].

Despite many studies and its commercial use in manufacturing sectors, there are still disagreements on the underlying mechanisms of EAD, in particular with respect to distinguishing between thermal and athermal effects [4]. Exploring these effects will require improved devices and methods for characterizing materials that have undergone EAD, and the ability to differentiate the mechanisms behind these effects.

Contemplated herein is an electro-thermo-mechanical tensile testing method and device for wires. The contemplated electro-thermo-mechanical tensile testing device (hereinafter "ETM device" or "testing device") and method aids in separating the thermal and athermal effects in sample materials by operating on wires of limited dimension. Testing a small-scale sample, compared to bulk ones, offers a unique advantage for accurate electromechanical characterization because the total heat generation from volumetric Joule heating decreases with reduction of a sample size and thermal dissipation becomes more effective due to a large surface-to-volume ratio.

According to various embodiments, the contemplated electro-thermo-mechanical tensile testing device comprises an electronic balance, a piezoelectric actuator with controller, an optical microscope and camera, a DC power supply, and a sample holder. As will be discussed below, the contemplated method for measuring mechanical properties is based on two mechanisms: (i) a force-controlled weight measurement using the electronic balance and (ii) a displacement measurement using the digital image correlation (DIC) method.

While using micron-scale wires to investigate the underlying mechanisms of EAD provides thermal advantages, the samples themselves are very fragile and easy to damage while handling. The testing device contemplated herein makes use of a novel sample frame to hold the wire. The contemplated sample frame is inexpensive, easy to modify, and provides protection to the wire sample during setup without interfering with the subsequent measurements. According to various embodiments, the ETM device is able to provide greater accuracy at a significantly lower cost than conventional testing devices. The contemplated device is able to separate thermal from athermal testing effects while providing high resolution strain and stress measurements at a lower cost than conventional methods.

A specific, non-limiting embodiment of the contemplated ETM device and method have been validated experimentally through an investigation of the role of Joule heating on electrically assisted deformation of 100-μm-diameter Ti-6Al-4V (at. %) wires, which were quantitatively characterized with both experimental temperature measurement and finite element analysis. This was subsequently utilized for an accurate evaluation of the temperature profile in the wire samples. In contrast to the previous reports that used bulk scale samples, the results obtained with the contemplated device and method indicate that enhanced formability of Ti-6Al-4V under 10 and 20 A/mm$^2$ is mainly due to a thermal effect. SEM images of the fracture surfaces under 0, 10 and 20 A/mm$^2$ show a transition in failure mode from shear dominant failure to significant necking formation likely due to a localized increase of current density.

It should be noted that the exploration of the behavior of 100-μm-diameter Ti-6Al-4V (at. %) wires is provided as a non-limiting example. Those skilled in the art will recognize that the contemplated testing device and method may be used with a wide variety of wire materials and sizes. Furthermore, while much of the following discussion is done in the context of a device used to investigate plastic deformation behavior under different electrical currents, those skilled in the art will recognize that the ETM device and method contemplated herein, and portions thereof, may be adapted for use in other investigations. For example, the sample frame contemplated herein could be adapted for use in other investigations exploring various properties of otherwise fragile wire samples.

Figure 1B:
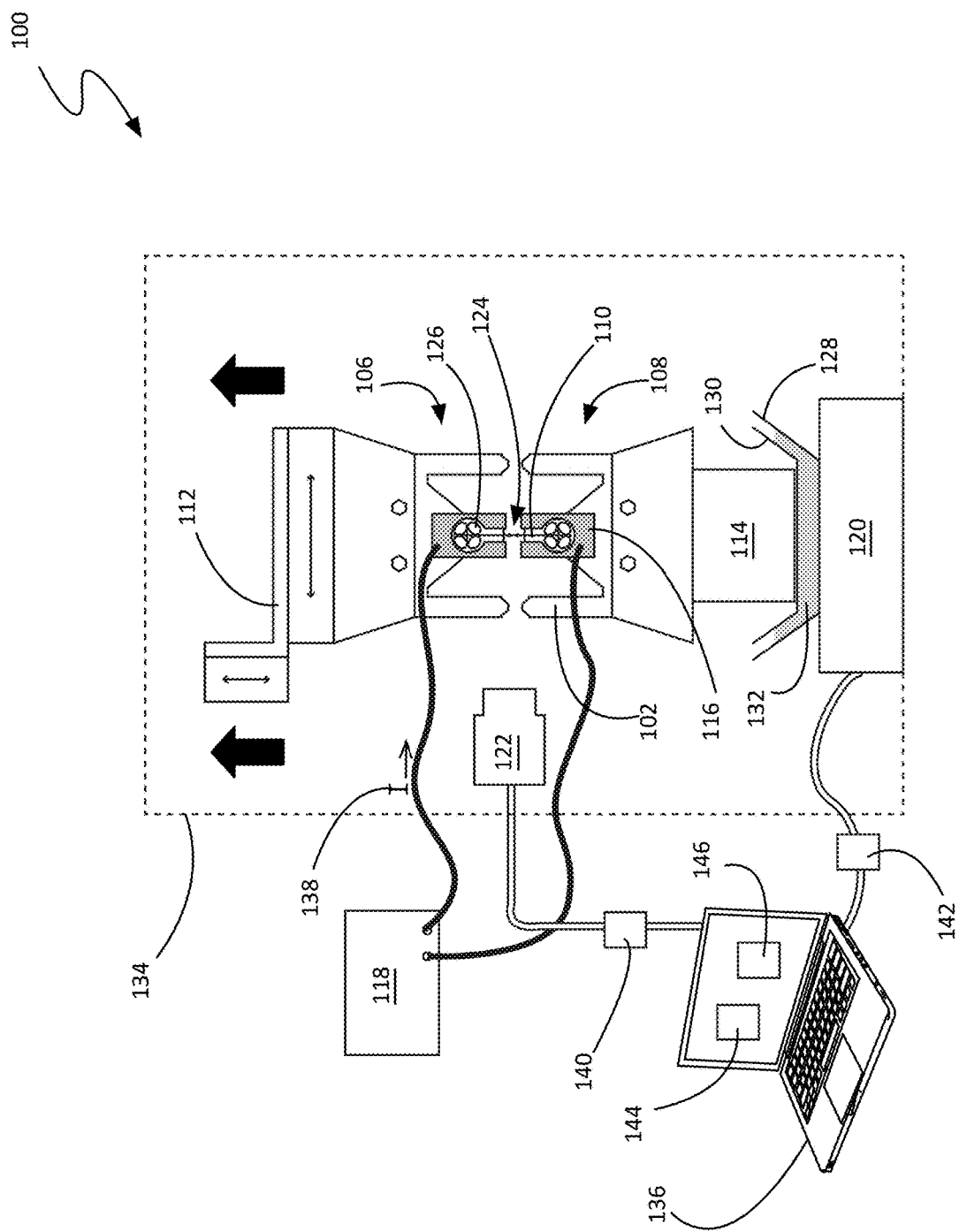

FIGS. 1A and 1B are schematic views of a non-limiting example of an electro-thermo-mechanical (ETM) tensile testing device 100 before and during testing, respectively. As shown, the contemplated ETM device 100 comprises a sample frame 102, a piezo actuator 112, a weight 114 of known mass, a DC power supply 118, an electronic balance 120, a digital camera 122, and a data acquisition device 136, according to various embodiments. According to various embodiments, some or all of these elements may be coupled to each other using 3D printed thermoplastic connectors. Each will be discussed in turn.

Although there are many advantages to working with micron-scale wires, they can be very fragile and are easily damaged. The sample frame 102 is a structure that protects the micron-scale wires from damage during set up but does not interfere with measurements once the testing has begun. The sample frame 102 contemplated herein is inexpensive, easily customized, and well adapted for protecting the wire sample 110.

According to various embodiments, the sample frame 102 comprises an upper part 106 and a lower part 108. The upper part 106 is attached to the lower part 108 through a plurality of sacrificial supports 104. These sacrificial supports 104 rigidly couple these two parts such that a wire sample 110 mounted between the two parts is protected from damage during setup (e.g., loading the sample frame 102 into the device 100, etc.). When the time comes to begin measurements, the sacrificial supports 104 are easily removed or disabled.

As shown, the upper part 106 and the lower part 108 each have an electrical contact pad 116. The upper part 106 and the lower part 108 themselves are electrically non-conductive. When affixed to the sample frame 102, a wire sample 110 communicatively couples the upper part 106 and the lower part 108 through their respective electrical contact pads 116. In some embodiments, the upper part 106 and the lower part 108 each comprise at least one protrusion 126, which may be used to help attach the wire sample 110 to the sample frame 102. The sample frame 102 and its various features will be discussed in greater detail with respect to FIGS. 4A and 4B, below.

According to various embodiments, the wire sample 110 is a wire having a micron-scale diameter that is being characterized by the contemplated ETM device 100. The wire sample 110 is affixed to the sample frame 102, the wire sample 110 communicatively couples the upper part 106 and the lower part 108 through their respective electrical contact pads 116. The wire sample 110 itself comprises a plurality of tracking beads 124 that are adhered to the wire, facilitating accurate measurements using images 140 taken with the digital camera 122, as will be discussed further, below.

As shown, the sample frame 102 is rigidly coupled to a piezo actuator 112 and a weight 114 of known mass. Specifically, the upper part 106 of the sample frame 102 is coupled to a piezo actuator 112, and the lower part 108 of the sample frame 102 is coupled to a weight 114 of known mass.

According to various embodiments, the X/Y/Z stages of the piezo actuator 112 allow fine position control of the sample frame 102 for sample alignment (i.e., X and Y directions) and mechanical loading (i.e., the Z direction). The piezoelectric actuator 112 is advantageous due to precision with which it can be moved. In one specific embodiment, the piezo actuator 112 may be a PZA12 from Newport, and may be operated with a controller (e.g., PZC200 from Newport, not shown). In other embodiments, other actuators may be used in place of the piezo actuator 112, given that they provide sufficient accuracy for the mechanical loading.

The lower part 108 of the sample frame 102 is rigidly coupled to a weight 114 of known mass. The purpose of the weight 114 of known mass is to subject the wire sample 110 to a predictable force as the piezo actuator 112 translates upward. According to various embodiments, the weight 114 rests on top of the electronic balance 120, which is positioned beneath the weight 114. In a specific embodiment, the electronic balance 120 may be a Ranger™ 3000 from Ohaus. In other embodiments, other electronic balances may be used. The roles of the weight 114 and the electronic balance 120 will be discussed in greater detail with respect to FIG. 2, below.

In some embodiments, the weight 114 may be placed directly on top of the electronic balance 120. In other embodiments, including the non-limiting example shown in FIGS. 1a and 1b, a self-alignment mechanism may be positioned between the weight 114 and the electronic balance 120. A first vessel 128 containing water 132 (e.g., purified water, etc.) or some other liquid is placed on top of the electronic balance 120. A second vessel 130 is placed on the water 132 inside the first vessel 128, and the weight 114 is placed on the second vessel 130. Because the weight 114 is floating on the water 132 of the first vessel 128, horizontal movement is uninhibited to the point that the weight 114 becomes self-aligning with the sample frame 102. This self-alignment mechanism eliminates any unwanted horizontal force and bending to the wire sample 110 and, as a result, ensures uniaxial loading conditions during each test.

As shown, the device 100 comprises a DC power supply 118. According to various embodiments, the DC power supply 118 is communicatively coupled to the wire sample 110 through the electrical contact pads 116 of the upper part 106 and the lower part 108 of the sample frame 102. The DC power supply 118 is configured to pass a desired current 138 through the wire sample 110. In a specific embodiment, the DC power supply 118 may be a 2450 SourceMeter from Keithley. The connection between the DC power supply 118 and the sample frame 102 will be discussed further with respect to FIG. 4B, below.

The contemplated ETM device 100 also comprises a digital camera 122. The digital camera 122 is pointed at the wire sample 110 within the sample frame 102 such that the tracking beads 124 on the wire sample 110 are visible. The images taken of the tracking beads 124 by the digital camera 122 are used to calculate strain values 146 using digital image correlation, according to various embodiments.

In some embodiments, the digital camera 122 may have optics sufficient to clearly image the tracking beads 124. In other embodiments, the digital camera 122 may be used in conjunction with a microscope pointed at the tracking beads 124, to get a clearer image that may lead to better accuracy. In a specific embodiment, the digital camera 122 may be a MU2003-BI from AmScope, and it may be used with a microscope like a SZ series stereo microscope from AmScope.

As will be discussed below, the contemplated method for using the ETM device 100 for the thermo-electro-mechanical characterization of microscale wires comprises capturing images 140 from the digital camera 122 and recording weight measurements 142 from the electronic balance 120 simultaneously, at regular intervals, while testing is being performed. In some embodiments, the device 100 may comprise a programmable device (e.g., a computer, a microcontroller, an intervalometer, etc.) that is communicatively coupled to the electronic balance 120 and the digital camera 122 and able to trigger both instruments to capture an image 140/weight measurements 142 at the same time. In some embodiments, those images 140 and weight measurements 142 may be time stamped and stored on their respective origination devices for later retrieval and analysis. In other embodiments, this programmable device may also be a data acquisition device 136 that receives the images 140 and weight measurements 142 that were observed simultaneously, and then use the images 140 and weight measurements 142 to determine strain values 146 and stress values 144. As an option, some or all of said determination may be automated. Test procedures and subsequent analysis will be discussed in greater detail with respect to FIG. 3, below.

The contemplated ETM device 100 and method can be utilized to test different types of samples (e.g., different sample size, shape, properties, etc.) as the sample frame 102 can be easily modified to accommodate different samples. According to various embodiments, the sample frame 102 may be generated by a 3D printer. Additionally, the contemplated method can be adapted for measuring a different range of force with different resolution due to the use of a commercial electronic balance 120. In other words, the electronic balance 120 can be replaced with another electronic balance 120 that is chosen based on the expected force range.

According to various embodiments, the measurements being taken with a degree of sensitivity that very small environmental disturbances can have a non-negligible effect. Environmental perturbations may be minimized by covering the entire setup with a box 134, to avoid changes in the airflow around the wire sample 110. As a specific example, in some embodiments, at least the piezo actuator 112, the electronic balance 120, and the sample frame 102 may be enclosed within a box 134 during testing. Those skilled in the art will recognize other measures that may be taken to prevent interference from other forms of environmental perturbations that may include, but are not limited to, thermal and vibrational perturbations.

In some embodiments, the contemplated ETM device 100 may also include an IR thermometer, which may be used to observe the extent of Joule heating in a particular wire sample 110. This will be discussed further with respect to FIGS. 5A-7B, which details an investigation of the role of Joule heating on electrically assisted deformation of 100-μm-diameter Ti-6Al-4V (at. %) wire samples 110, which were quantitatively characterized with both experimental temperature measurement and finite element analysis, using the specific embodiment previously discussed. In other embodiments, the contemplated device may omit the IR thermometer in favor of using a sufficiently long waiting period after beginning to apply the desired current 138 to the wire sample 110.

FIG. 1A shows anon-limiting example of an ETM device 100 after being setup, but before testing has begun. FIG. 1B shows that same non-limiting example after testing has begun. As shown, the sacrificial supports 104 have been destroyed or otherwise compromised, such that the sole connection between the piezo actuator 112 and the weight 114 is the wire sample 110. According to various embodiments, the contemplated ETM characterization comprises a desired current 138 being applied to the wire sample 110 using the DC power supply 118. The wire sample 110 is loaded or put under strain by lifting the upper part 106 of the sample frame 102 using the piezo actuator 112. According to various embodiments, the speed of displacement between the upper part 106 and lower part 108 of the sample frame 102 may be controlled by an actuator controller (not shown). The digital camera 122 and electronic balance 120 capture images 140 and weight measurements 142, respectively, at the same time and at regular intervals as piezo actuator 112 increases the vertical displacement until the wire sample 110 fails. The captured images 140 and weight measurements 142 are used to determine stress values 144 and strain values 146 for that particular wire sample 110. The contemplated method of characterization will be discussed in greater detail with respect to FIG. 3, below.

It should be noted that while certain devices from certain manufacturers were provided as part of a specific embodiment, they should not be taken as limiting, or even preferred. The contemplated device 100 and method will be discussed later on in the context of experiments performed on a specific wire material of a specific size, using a device employing these particular components and devices from the specific embodiment to obtain experimental results. In other embodiments, some or all of these specific components and devices may be replaced with others whose performance is sufficient to achieve the desired level of accuracy.

Figure 2:
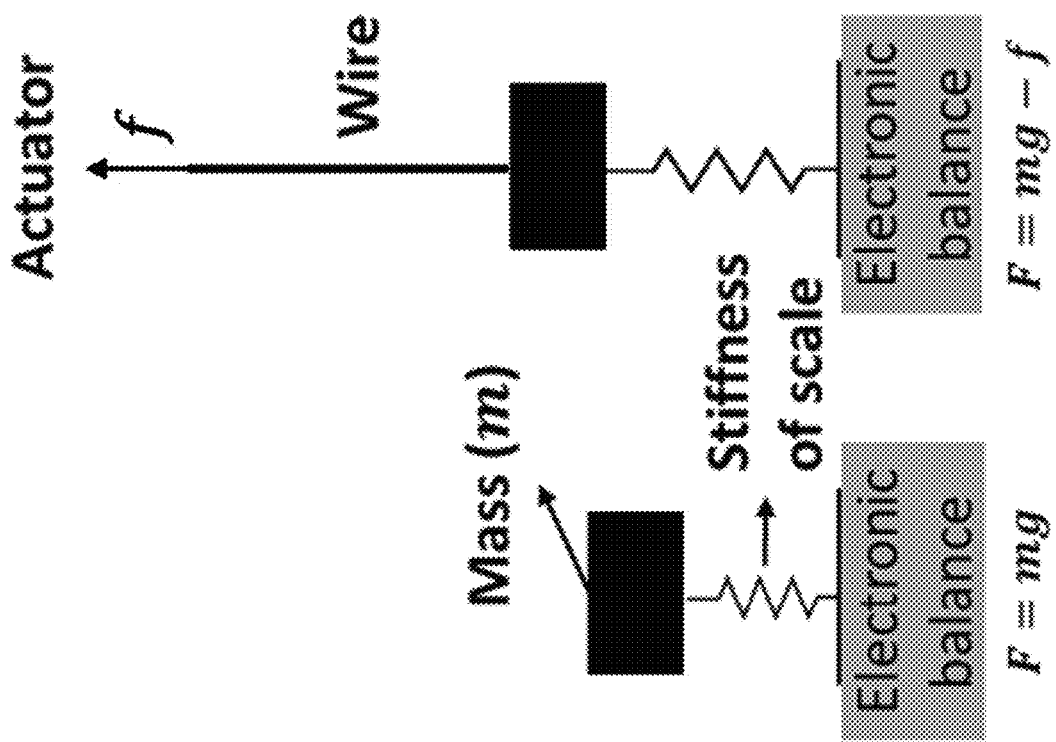
FIG. 2 is a schematic view of the working principle on which the contemplated ETM device and method are based.

FIG. 2 is a schematic view of the working principle on which the contemplated ETM device 100 and method are based. The electronic balance 120 is used as a force sensor. In a pre-loading state (left in FIG. 2), the total force F measured by the electronic balance 120 is simply due to the weight 114 of known mass (i.e., F=mg) where m is the known mass of the weight 114 and g is a gravitational acceleration (9.8 m/s$^2$). When the wire sample 110 is uniaxially stretched in the Z direction by the piezo actuator 112, the total force (F) measured by the electronic balance 120 reduces by a force f that is acting on the wire sample 110 (or F=mg−f).

It is important to note that displacement of the piezo actuator 112 is not fully translated into deformation of a wire sample 110 (i.e., strain). In fact, the deformation of the wire sample 110 is much smaller than the displacement of the piezo actuator 112 because the force acting on the sample also lifts a mass, as shown in FIG. 2. Because of this, the change in the total force is continuously monitored to calculate the force (f). As will be discussed below, the contemplated method is a force-controlled experiment, meaning the applied force (f) keeps increasing with the displacement of the piezo actuator 112 in the Z direction while f is being continuously monitored, according to various embodiments.

Figure 3:
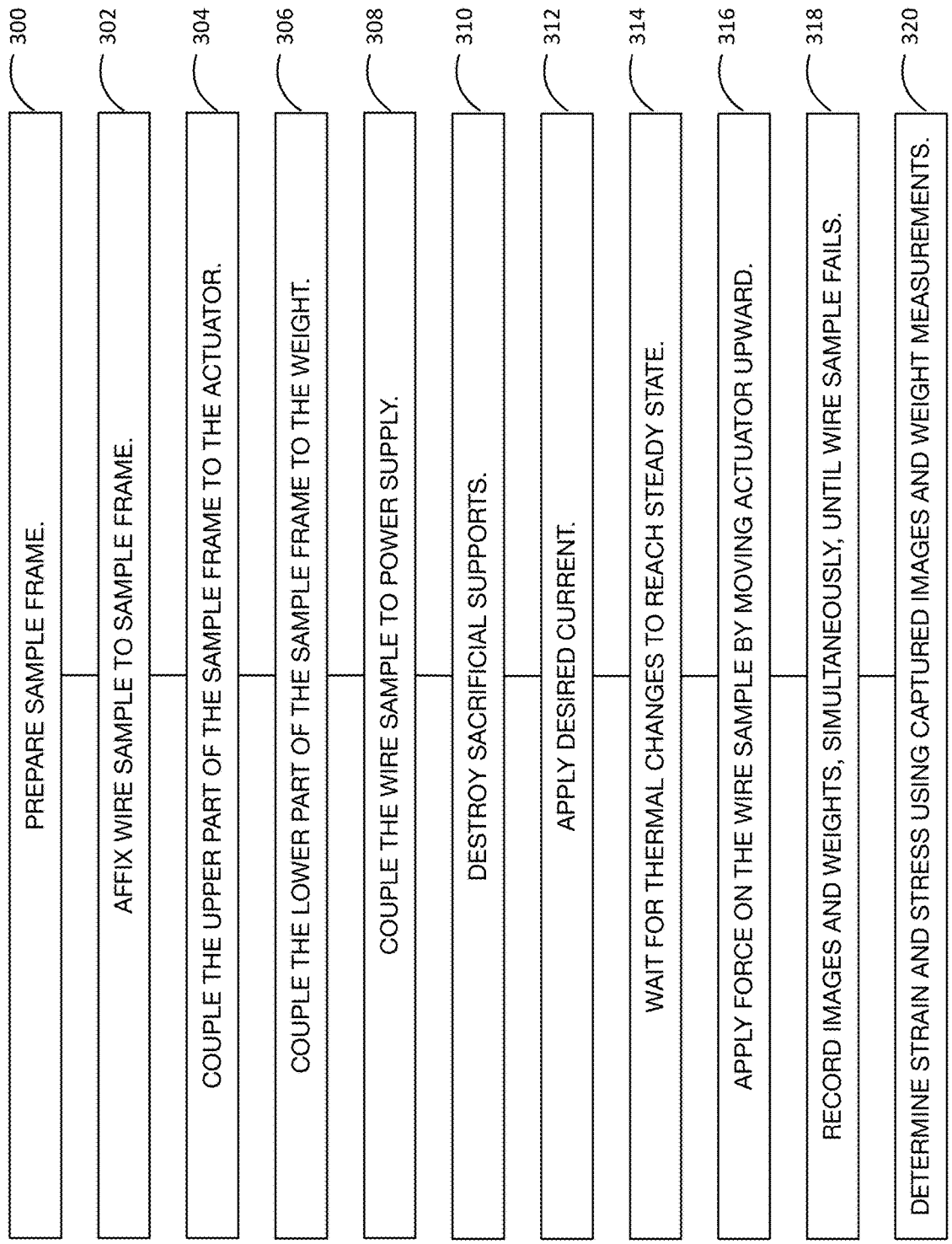
FIG. 3 is a process flow of a method for the thermo-electro-mechanical characterization of a micron-scale wire using an ETM device.

FIG. 3 is a process flow of a method for the thermo-electro-mechanical characterization of a micron-scale wire sample 110 using an ETM device 100, including setup, experimental procedure, and subsequent analysis.

First, the sample frame 102 is prepared. See step 300. Preparation of the sample frame 102 begins with fabrication. According to various embodiments, the sample frame 102 is a 3D-printed plastic frame. Advantageously, the sample frame 102 can be produced using an off-the-shelf commercial 3D-printer, making it easy to customize the sample frame 102 for specific wire samples 110 while also reducing the overall cost of the device 100.

The upper part 106 and the lower part 108 are rigidly coupled to each other through a plurality of sacrificial supports 104 designed to provide strength yet are also easily removed or otherwise compromised. In some embodiments, the sacrificial supports 104 may be added to already fabricated upper and lower parts and may be composed of a different material than the upper and lower parts. In other embodiments, the sacrificial supports 104 may be made integral with the upper part 106 and the lower part 108, all being fabricated as a single piece of material.

The preparation of the sample frame 102 also comprises affixing electrical contact pads 116 to the upper part 106 and the lower part 108. This will be discussed in greater detail with respect to FIG. 4B.

Next, the wire sample 110 is affixed to the sample frame 102. See step 302. The wire sample 110 is affixed to the sample frame 102 such that the upper part 106 and the lower part 108 are connected through the wire sample 110 both mechanically and electrically. These connections are best discussed in the context of FIGS. 4A and 4B, in a brief detour from this examination of the contemplated method for the thermo-electro-mechanical characterization of a micron-scale wire sample 110 using an ETM device 100.

Figure 4A:
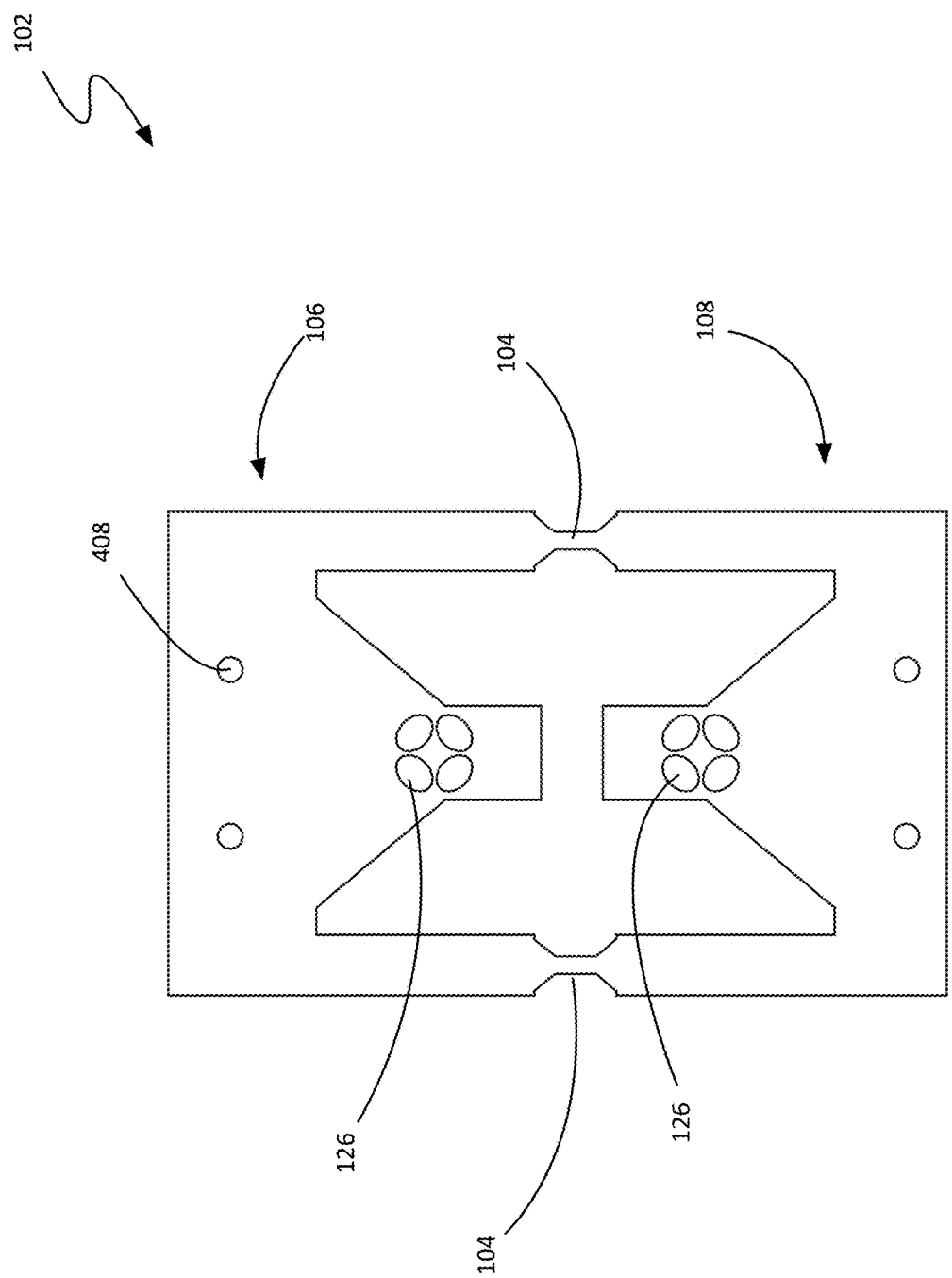
FIGS. 4A and 4B are front views of a sample frame in different stages of assembly and use.
Figure 4B:
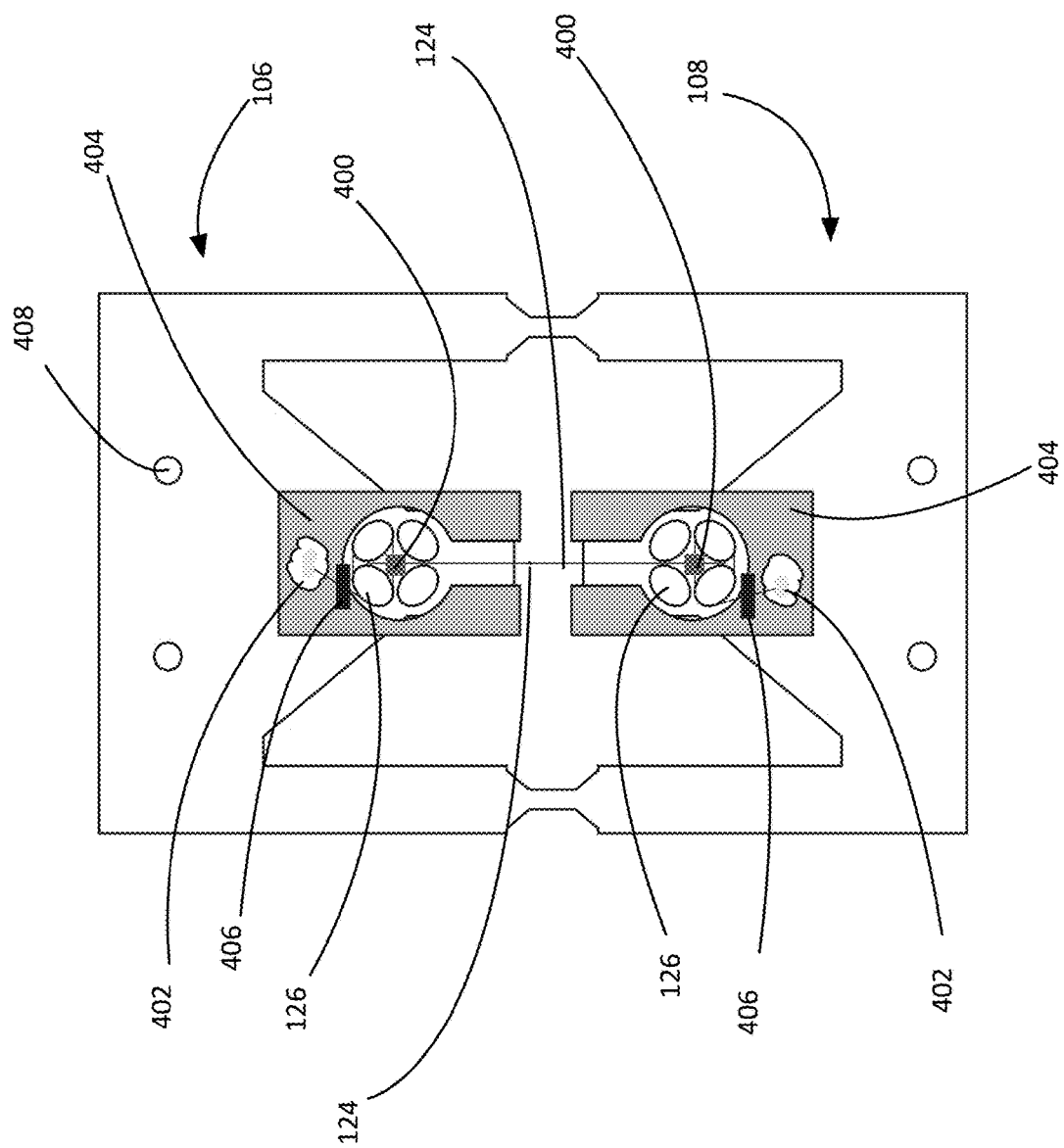

FIGS. 4A and 4B are front views of a non-limiting example of a sample frame 102 in different stages of assembly and use. Specifically, FIG. 4A is a front view of a non-limiting example of a sample frame 102 fabricated as a single, integral piece comprising an upper part 106, a lower part 108, a plurality of sacrificial supports 104, and a plurality of protrusions 126. FIG. 4B is a front view of that same sample frame 102, after preparation and with a wire sample 110 loaded.

According to some embodiments, the upper part 106 and the lower part 108 each comprise at least one protrusion 126, for attaching the wire sample 110 to the sample frame 102. These protrusions 126 are configured to eliminate any slip between the wire sample 110 and sample frame 102 during the test as each end of the wire sample 110 is looped or wrapped around at least one protrusion 126 on each of the upper part 106 and the lower part 108 of the sample frame 102. In other embodiments, the wire sample 110 may be attached to the upper part 106 and lower part 108 in such a way that slip is prevented using a different structure or feature, such as a hole through which the wire sample 110 may be fed and then wrapped around the upper/lower part such that the wire is pressed into the surface of the sample frame 102.

The sample frame 102 comprises a plurality of sacrificial supports 104 that rigidly connect the upper part 106 of the sample frame 102 with the lower part 108 of the sample frame 102. During sample preparation and the assembly of the sample frame 102, these sacrificial supports 104 help avoid any unwanted mechanical loading to the wire sample 110. When preparations are complete and testing is about to begin, these sacrificial supports 104 are carefully destroyed, leaving the wire sample 110 as the only connection between the weight 114 and the piezo actuator 112.

In some embodiments, the sample frame 102 is rigidly coupled to the piezo actuator 112 and the weight 114 using fasteners (e.g., bolts, pins, etc.) passing through one or more apertures 408 in the upper part 106 and lower part 108 of the sample frame 102. In other embodiments, the sample frame 102 may be rigidly coupled to these loadings in any other manner known in the art.

FIG. 4B shows the sample frame 102 of FIG. 4A, after preparation and with a wire sample 110 loaded. As part of the preparation, additional elements are affixed to the sample frame 102 in preparation to measure the electro-thermo-mechanical properties of a wire sample 110. The sample frame 102 serves to limit any unwanted forces from being exerted on the wire sample 110, including forces due to the electrical connection between the wire sample 110 and a DC power supply 118. According to various embodiments, the wire sample 110 is communicatively coupled to the power supply 118 through electrical contact pads 116 affixed to the upper part 106 and the lower part 108 of the sample frame 102. For example, in some embodiments including the non-limiting example shown in FIG. 4B, the electrical contact pads 116 may be two rectangular copper foils 404 glued onto the electrically non-conductive sample frame 102 by epoxy glue (e.g., Quick-setting epoxy from JB Weld, etc.). Advantageously, these thin copper foils 404 provide effective thermal dissipation and electrical connection to the wire sample 110. As an option, the copper foils 404 may be polished by a spinning wire brush to remove sharp edges (e.g., to avoid mechanical damage to the fine wire sample 110), and to remove oxide layers to achieve better electrical contact. Those skilled in the art will recognize that other conductive pads may be used in other embodiments.

The wire sample 110 may be affixed to the sample frame 102 by first wrapping or looping around at least one protrusion 126 on each of the upper part 106 and the lower part 108, according to some embodiments. As shown, the wire sample 110 may then be affixed to the protruding structures with adhesive 400 (e.g., epoxy, etc.). In other embodiments, the wire sample 110 may simply be affixed to the sample frame 102 with an adhesive 400 at a different location.

As previously discussed, the wire sample 110 is affixed to the sample frame 102 such that the electrical contact pad 116 of the upper part 106 is communicatively coupled to the electrical contact pad 116 of the lower part 108 through the wire sample 110. In some embodiments, this is accomplished by coupling the ends of the wire sample 110 to the electrical contact pads 116, while in other embodiments, the connection to the electrical contact pads 116 may be elsewhere on the wire sample 110.

In the non-limiting example shown in FIG. 4B, the tails of the wire sample 110 are the point of interface between the electrical contact pads 116 and the wire sample 110. According to various embodiments, the wire sample 110 may be communicatively coupled to the electrical contact pads 116 through a conductive paste 402, providing electrical and thermal contact.

Returning to the specific embodiment previously discussed, the wire sample 110 may be a Ti-6Al-4V (at. %, Grade 5 from Goodfellow) wire sample 110 with 100 μm diameter. The wire sample 110 may be first positioned using carbon tape 406 and then permanently glued onto the sample frame 102 with an epoxy (e.g., Ultrathin 2 resin and hardener from Pace technology, etc.) or other appropriate adhesive 400. Conductive silver paste 402 (e.g., ETC bond 597A from Electron Microscopy Sciences, etc.) is then applied between the wire sample 110 and copper foils 404 for electric and thermal conductivity at the interface. The sample may be subsequently cured in an oven (e.g., Gravity Convection Oven from Cole-Parmer Instrument Co., etc.) for 2 h at 40° C., in this specific non-limiting example.

Finally, the gauge section of the wire sample 110 is decorated with tiny adhesive tracking beads 124 as image tracking markers for automated strain measurement, as is known in the art.

Returning to the process flow of FIG. 3, now that the sample frame 102 has been prepared and the wire sample 110 loaded, the testing may begin. The following steps are a non-limiting example of the procedure for performing the tensile test itself. Those skilled in the art will recognize that certain steps may be accomplished in a variety of ways (e.g., the removal of the sacrificial supports 104, etc.) without departing from the purpose of this process.

The tensile test begins with loading the sample frame 102 into the device 100. Specifically, the upper part 106 is coupled to the piezo actuator 112 (see step 304) above the sample frame 102, and the lower part 108 is coupled to the weight 114 of known mass below the sample frame 102 (see step 306), the weight 114 located on the electronic balance 120 (or previously discussed self-aligning mechanism).

As shown in FIGS. 4A and 4B, the sample frame 102 may have a plurality of apertures 408 (e.g., two on the upper part 106, two on the lower part 108) for integrating the sample frame 102 with the X/Y/Z linear piezo actuator 112 stage (near top in FIGS. 1A and 1B) and the weight 114, respectively. The upper part 106 and lower part 108 of the sample frame 102 are rigidly coupled to loading structures using nuts and bolts or any other means of coupling known in the art, according to various embodiments.

Next, the wire sample 110 is connected to the DC power supply 118. See step 308. According to various embodiments, the DC power supply 118 is coupled to the electrical contact pads 116 of the sample frame 102 (e.g., the copper foils 404) in such a way that any force exerted by the cables connecting to the DC power supply 118 will be applied solely to the sample frame 102 and/or loadings, and not the fragile wire sample 110. As an option, before each experiment, the closed circuit may be confirmed by applying small electrical current (e.g., below 1 A/mm$^2$) through the wire sample 110, to verify the connection is good.

After the DC power supply 118 has been connected, and there is no longer any need for direct interaction with the sample frame 102, the sacrificial supports 104 are destroyed or otherwise compromised. See step 310. Destroying or compromising the sacrificial supports 104 makes the wire sample 110 the sole connection between the upper part 106 and the lower part 108, both mechanical and electrical.

After checking the circuit, the piezo actuator 112 may be activated in a compressive manner slightly, to prevent any accidental loads when the sacrificial supports 104 on the sample frame 102 are removed. In a specific embodiment, a soldering iron may be used to carefully melt away the plastic sacrificial supports 104. In other embodiments, the sacrificial supports 104 may be composed of varied materials and/or be broken, severed, dissolved, or otherwise compromised using various methods known in the art.

After the sacrificial supports 104 have been compromised, the upper part 106 and lower part 108 of the sample frame 102 are connected only via the wire sample 110. The digital camera (and microscope, in some embodiments) is then focused on the tracking markers or tracking beads 124 on the wire sample 110. For the alignment of the wire sample 110, the horizontal position of the upper part 106 may be adjusted by the piezo actuator 112 on the scale of micrometers (i.e., moving the X/Y linear stage). Then the wire sample 110 is loaded with a small force within the elastic deformation region, for fine alignment. Optical observations during the sample alignment will confirm that the self-alignment mechanism indeed allows uniaxial loading conditions. The small force is removed before performing each tensile test, according to various embodiments.

Next, a desired current 138 is applied to the wire sample 110 using the DC power supply 118. See step 312. For the electro-thermo-mechanical tensile test, the desired current density (from 0 to 20 A/mm$^2$ in the specific embodiment) is applied, based on the known cross-section of the wire sample 110. The application of this current 138 will result in some degree of Joule heating. After the current 138 begins to flow, the experiment waits for the resulting thermal changes to reach a steady state. See step 314. In the specific embodiment, the current 138 is applied for 15 minutes before each test to ensure that steady state is reached.

Next, force is applied on the wire sample 110 by displacing the upper part 106 of the sample frame 102 upward using the piezo actuator 112. See step 316. While force is being applied, and at regular intervals, images 140 and weight measurements 142 are recorded simultaneously, until the wire sample 110 fails. See step 318.

Continuing with the specific example, a series of images 140 are taken with three-second intervals, and weight measurements 142 from the electronic balance 120 are synchronized with the images 140. The force and displacement data may be obtained using methods specific to the equipment being used (e.g., SPDC data collection, AmScope software, etc.). After acquiring force displacement measurements, the wire sample 110 is quasi-statically loaded by the piezo actuator 112. According to various embodiments, the test is continuously performed until specimen failure.

Finally, strain values 146 and stress values 144 are determined using the captured images 140 and weight measurements 142. See step 320. The strain measurement is performed using the hundreds or thousands of images 140 captured. According to various embodiments, the images 140 are analyzed by a digital image correlation (DIC) method, a well-established technique for strain measurements. Four tracking points from the tracking beads 124 are selected as reference points and the changes of their locations may be automatically tracked by customized MATLAB-based DIC code, or other software known in the art. The corresponding force is obtained from the concurrent weight measurements 142 using the electronic balance 120 and the stress values 144 are calculated by using the measured wire sample 110 cross section.

The following is a discussion of the application of the specific embodiment of the device and method discussed above to a specific wire sample, Ti-6Al-4V (at %). The following discussion is done in the context of computational investigations and previous experimental studies using conventional devices and methods, using the same material, for validation purposes.

The Ti-6Al-4V wires were tested via the disclosed novel electro-thermo-mechanical tensile testing device to elucidate the role of Joule heating on the electrically assisted deformation of Ti-6Al-4V. The deformation behavior of fine wire with a diameter of 100 μm was investigated under different applied currents. The results are here compared to the previous results without any current or with current in the context of electrically assisted deformation.

The experimental setup for the temperature characterization of a wire sample under current includes an IR thermometer. Due to intrinsic thermo-electrical coupling (i.e., Joule heating), it is important to characterize the electrically induced temperature profile in each wire sample. For temperature measurement, a non-contact IR method was utilized because any mechanical contact with a probe could result in considerable heat loss through the contact and could alter the temperature profile in a wire. Due to limited spatial resolution of the IR camera (i.e., a minimum spot size of 0.8 mm and a wire diameter of 0.1 mm), direct temperature from the micro-scale wire samples was not possible. Alternatively, temperature at the junction of the wire and sample frame 102 was monitored and then a wire temperature profile was predicted by performing finite element analysis where the measured temperatures were used to validate the numerical predictions. An area of temperature measurement was coated with a thin layer of black graphite spray to achieve a large emissivity coefficient (i.e., 0.8, an experimentally measured value). This is critical, in this case, for accurate temperature measurement using an IR technology-based sensor considering the poor emissivity (0.03-0.04) of copper.

Figure 5:
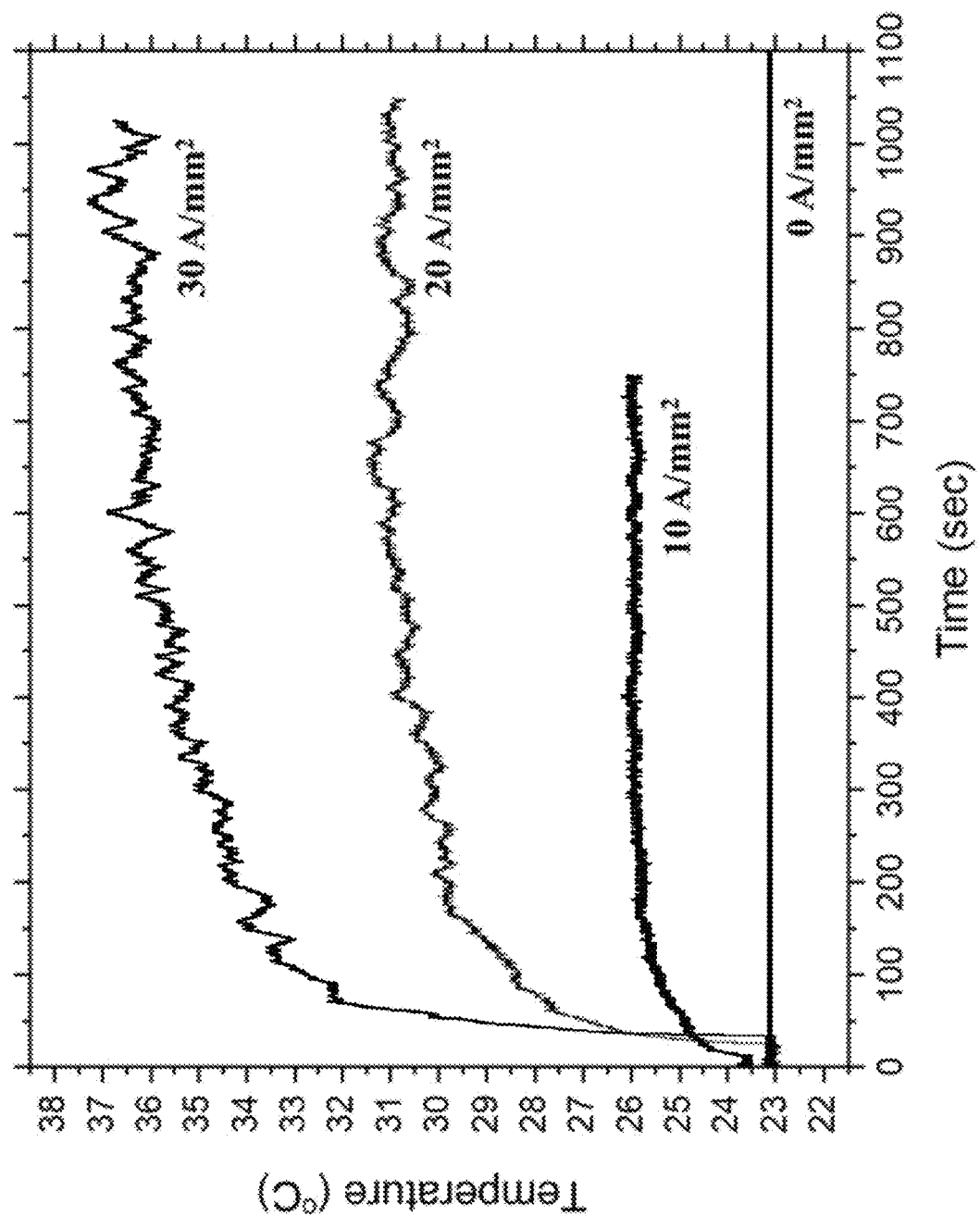
FIG. 5 is a plot of the temperature change over time due to an applied current density at the junction of the wire and the sample frame.

FIG. 5 shows the measured temperature change in time due to an applied current density at the junction of the wire 110 and sample frame 102. This shows the temperature increases in time under 0, 10, and 20 A/mm$^2$. The temperature change at the junction of the wire 110 and sample frame 102 is relatively small (i.e., <15° C.) after the temperature becomes steady state (e.g., >800 s). Note that, in some embodiments, 3D printed parts with relatively low meting temperatures can be directly used without any additional cooling instrument because of near room temperature conditions at the wire 110 and sample frame 102 junction.

Figure 6:
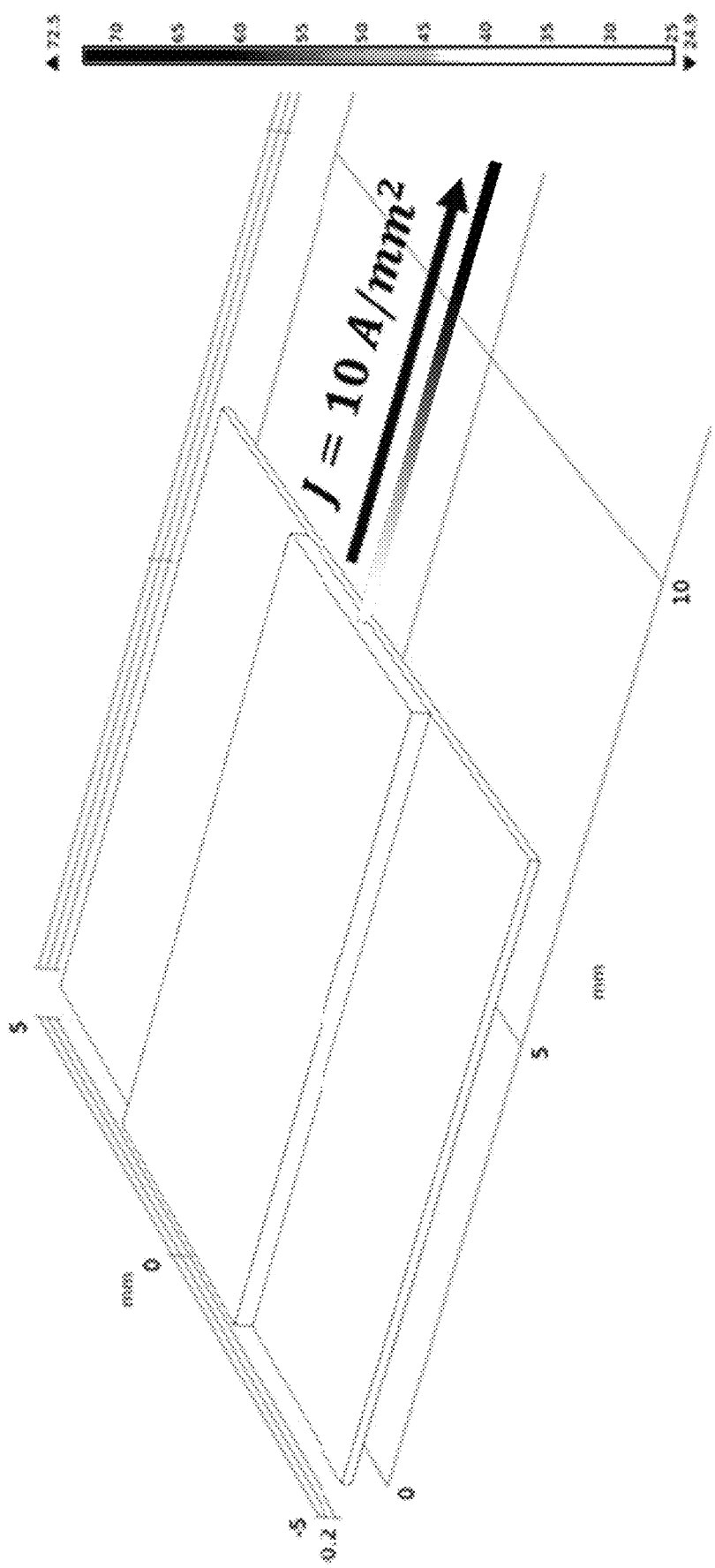
FIG. 6 shows the results of a finite element analysis of the wire and sample frame measured in FIG. 5.

A finite element analysis was performed to predict the temperature profile of a Ti-6Al-4V wire specimen 110 using the exact dimensions and material properties of the wire 110 and sample frame 102 measured in FIG. 5. FIG. 6 shows the results of the finite element analysis. The analysis considered the half-length (5 mm) of the wire 110 and one side of the sample frame 102 using the geometrical symmetry. It can be important to obtain a reasonable convection coefficient (h) as it is sensitive to ambient conditions and a direct measurement of h using an experimental method is non-trivial.

Figure 7A:
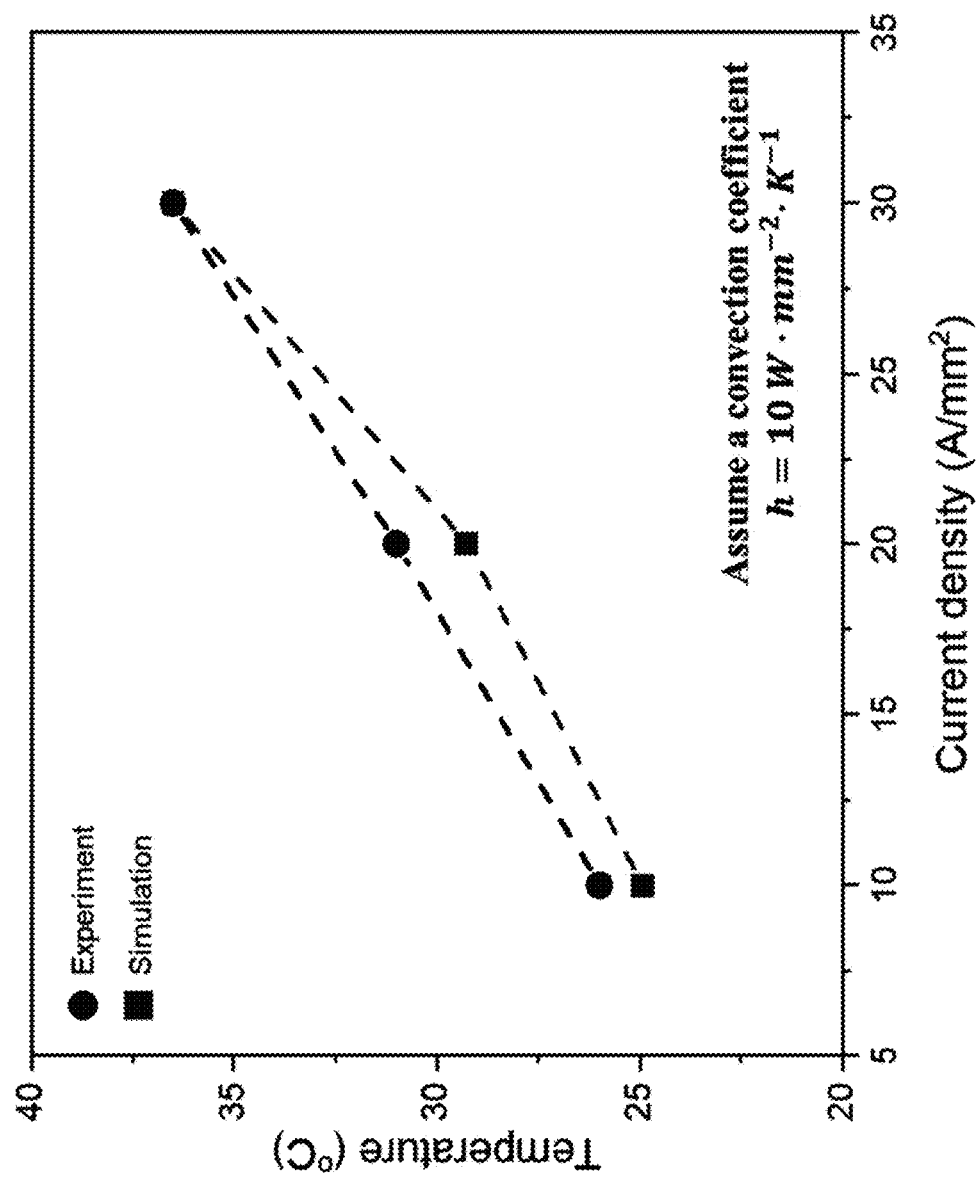
FIG. 7A is a parametric study of the relationship between temperature and current density based on experiment and simulation.
Figure 7B:
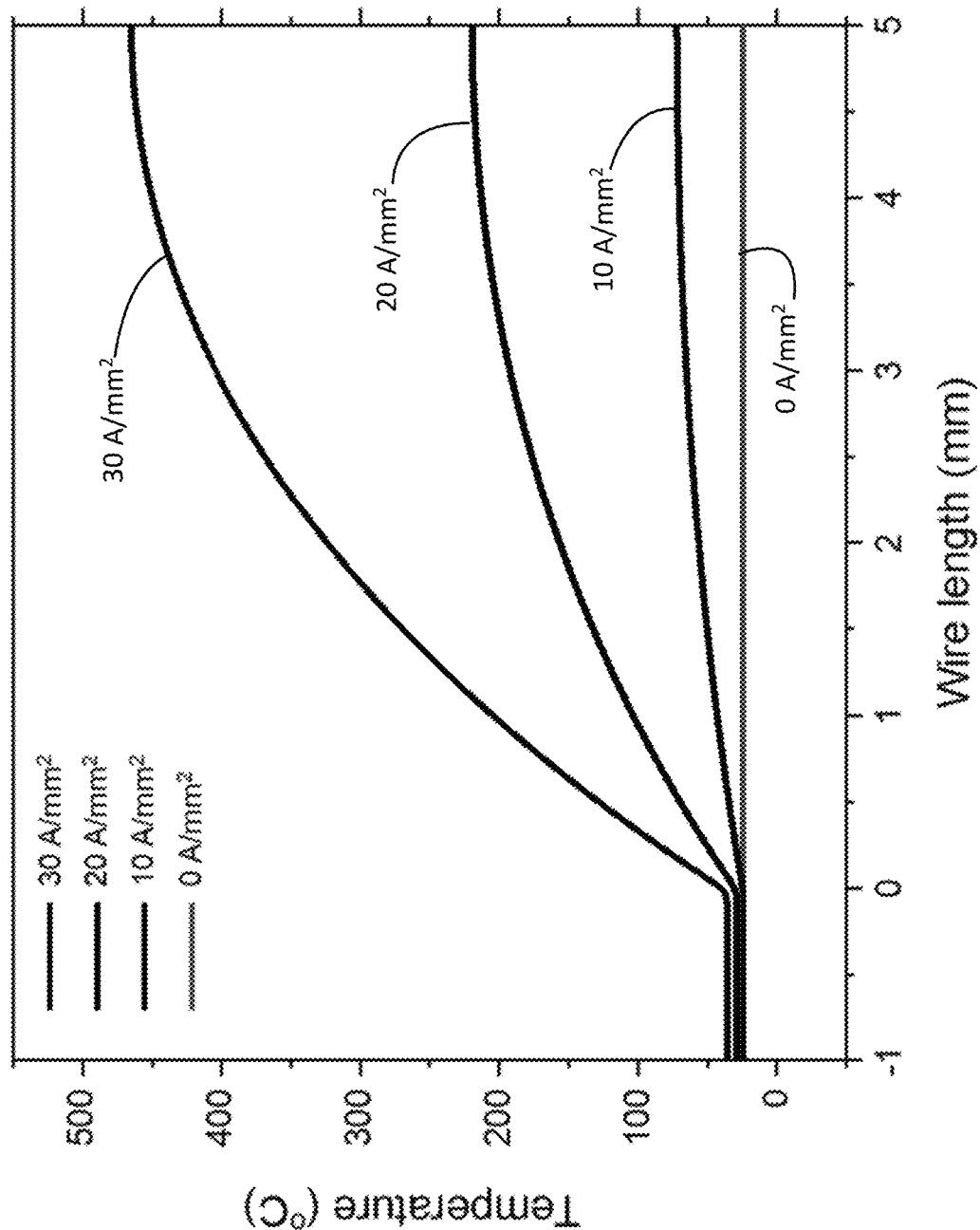
FIG. 7B is a plot showing a temperature profile predicted for a Ti-6Al-4V wire.

Since the value of h could be affected by the surrounding environment (e.g., free air, forced air, liquids, etc.), a numerical parametric sweep was performed to estimate a reasonable h value for this specific experimental setup. Known electrical densities (0, 10, and 20 A/mm$^2$) were applied to a wire sample 110 during the simulation while using different h values so that the measured temperature and predicted steady-static solutions at the junction of the wire 110 and sample frame 102 matched well to each other. The other parameters were held fixed. For example, compared to the simulation results using h=5 or 15 W/mm$^2$·K, the parametric study in FIG. 7a has indicated that h=10 W/mm$^2$·K is a reasonable convection coefficient as the simulation captures the experimentally measured boundary temperatures well (see FIG. 6a for exact location). Finally, the temperature profiles in a Ti-6Al-4V wire are predicted using h=10 W/mm$^2$·K where the maximum temperatures are 23.5, 72.5, 220, and 460° C. at 0, 10, 20, and 30 A/mm$^2$, respectively (FIG. 7b).

Figure 8A:
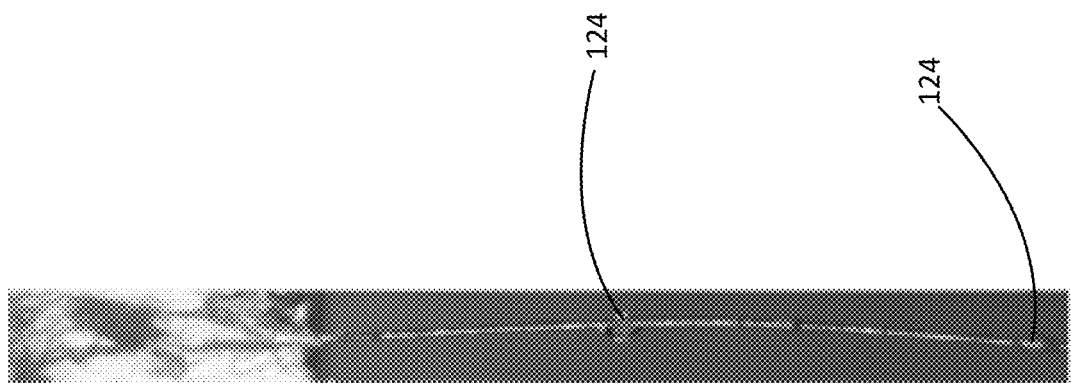
Figure 8B:
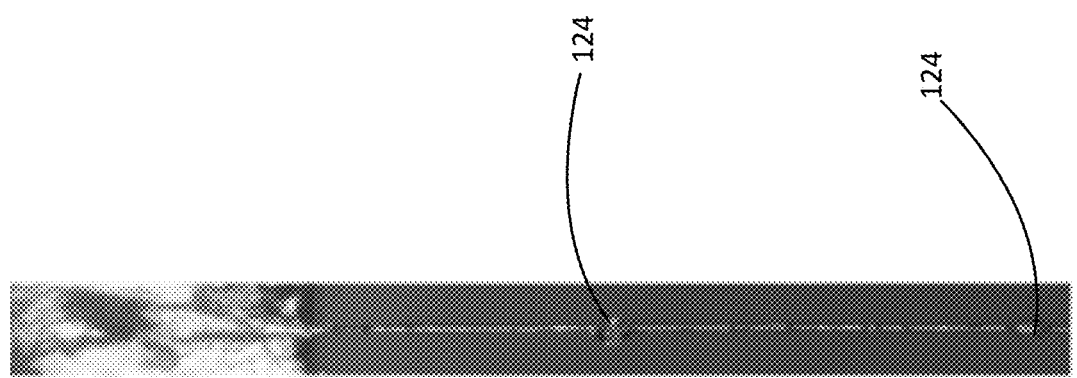
Figure 8C:
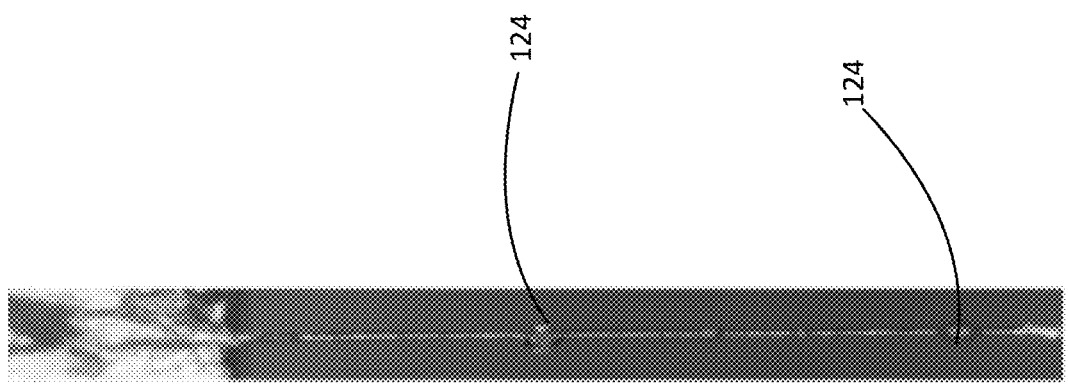
Figure 8D:
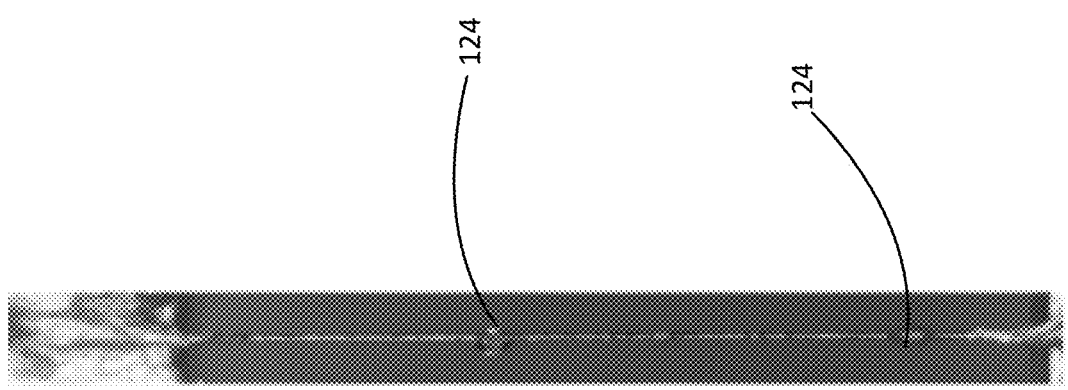
Figure 8E:
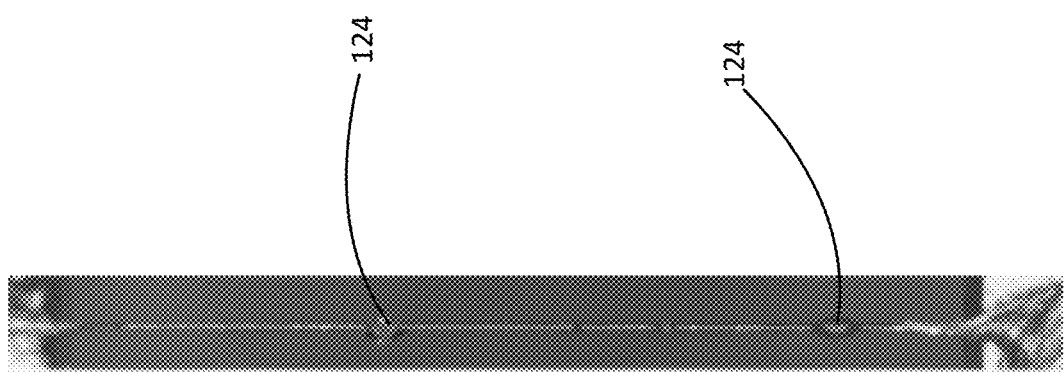

The electro-thermo-mechanical properties of Ti-6Al-4V wires 110 were also characterized. Electro-mechanical tensile testing of Ti-6Al-4V wires 110 was conducted using this specific embodiment of the contemplated device 100 and method. FIG. 8 shows representative optical images from the digital camera 122 of a wire sample 110 under 20 A/mm$^2$ current density. According to various embodiments, during sample manipulation and assembly, a small bending curvature in the wire sample 110 (FIG. 8a) may be maintained to avoid any unwanted tensile force on the wire 110. With the upward motion of the actuator 112 (FIG. 8b-8f), the wire 110 was aligned with the tensile loading direction by the water-based self-aligning mechanism previously discussed. FIGS. 8c and 8d are the images of the wire 110 in elastic and plastic deformation regions, respectively, as indicated in the stress-strain curve (FIG. 9). FIG. 8e shows the image corresponding to the maximum elongation right before the wire fracture shown in FIG. 8f.

Figure 9A:
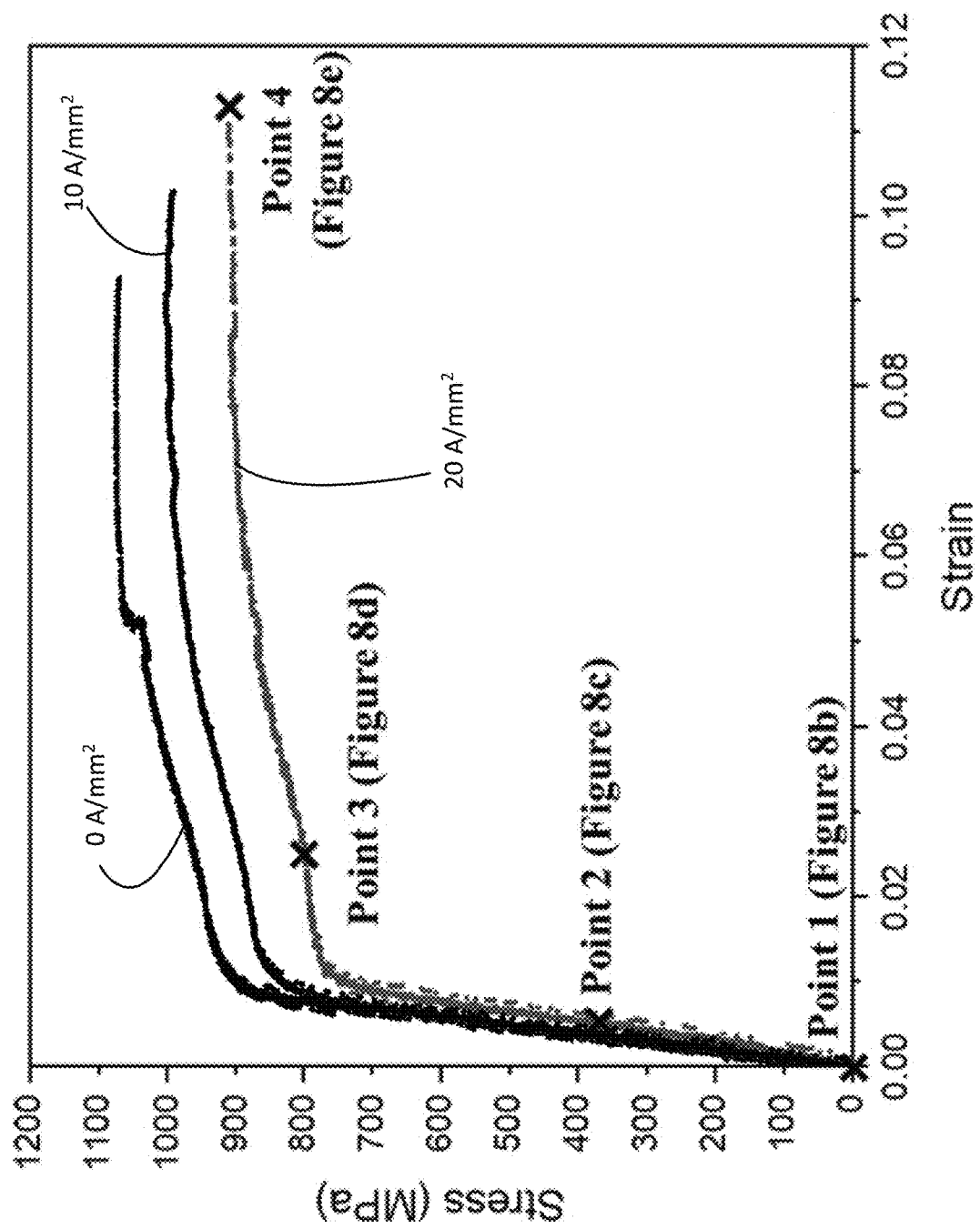
FIGS. 9A and 9B show stress-strain curves of a micron-scale Ti-6Al-4V wire and a Ti-6Al-4V sheet.

FIG. 9a presents the stress-strain relations of three independent Ti-6Al-4V wires under 0, 10, and 20 A/mm$^2$, as labeled. The key mechanical properties obtained from the stress-strain curves are summarized in the table in FIG. 10. Note that two specimens were tested without any current 138 whereas three specimens were investigated at each current density (i.e., 10 and 20 A/mm$^2$). The range of input current density was selected to avoid the significant thermal effect (see FIG. 7b) and to directly compare the experimental measurement with the previously reported results in the literature. For the validation of the experimental approach, the results without electric current 138 were first confirmed to match well with the known properties of bulk Ti-6Al-4V samples as listed in FIG. 10 (see the values of elastic modulus, yield strength, ultimate tensile strength, failure strength, and the maximum elongation (failure strain) under the literature reference and 0 A/mm$^2$).

Figure 11A:
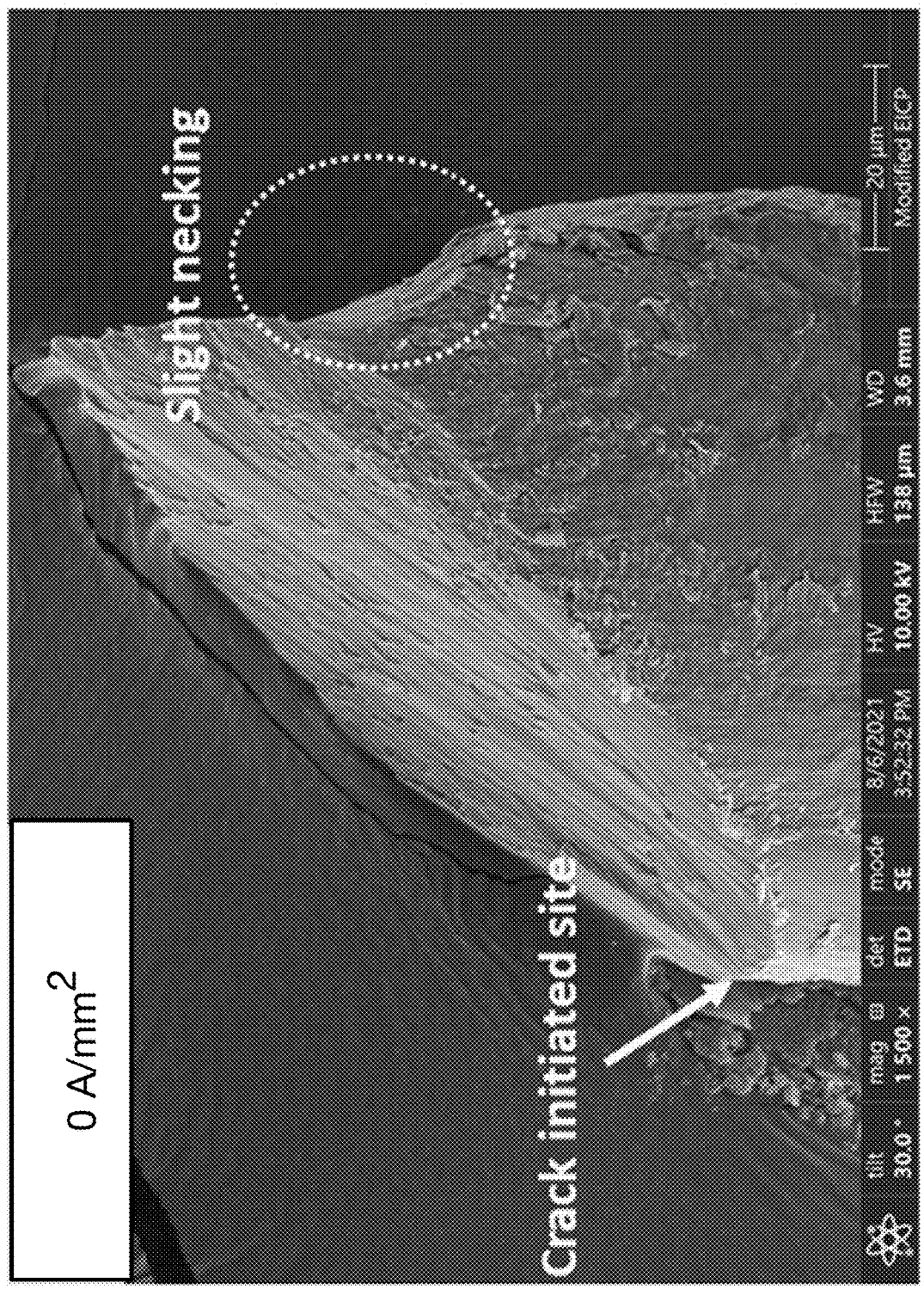
FIGS. 11A-11D are SEM images of fractured Ti-6Al-4V wires after exposure to different current densities.
Figure 11B:
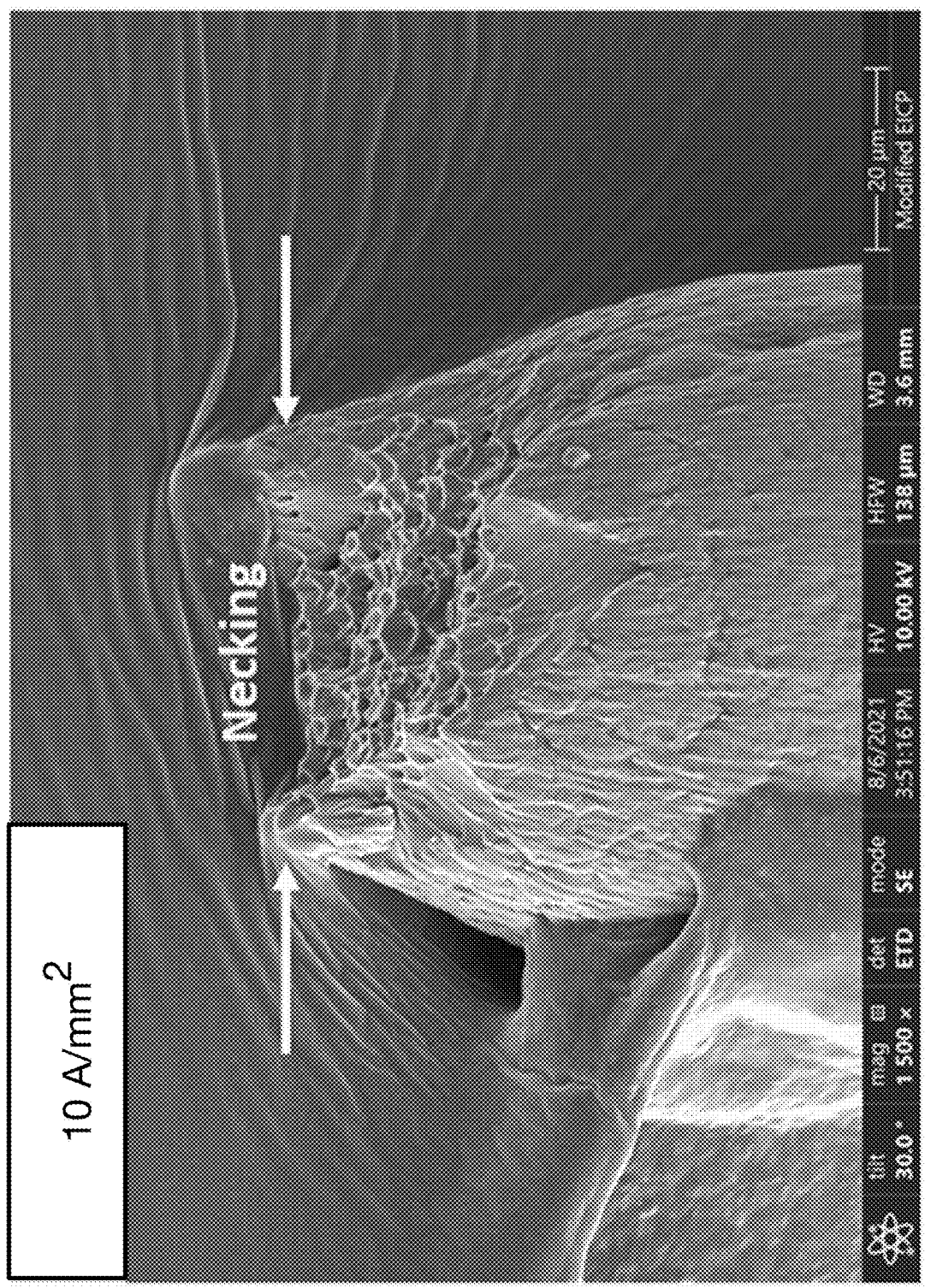
Figure 11C:
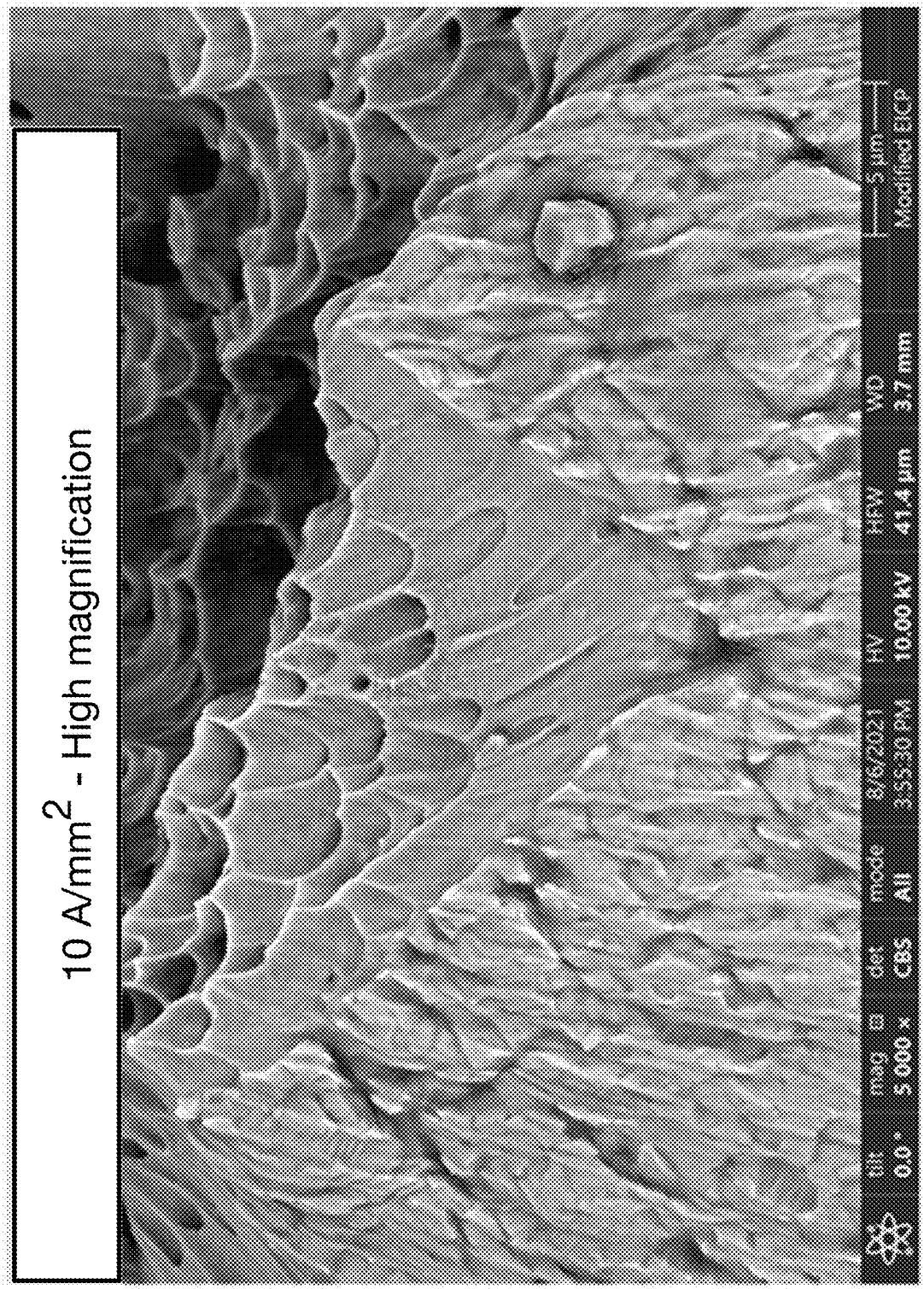
Figure 11D:
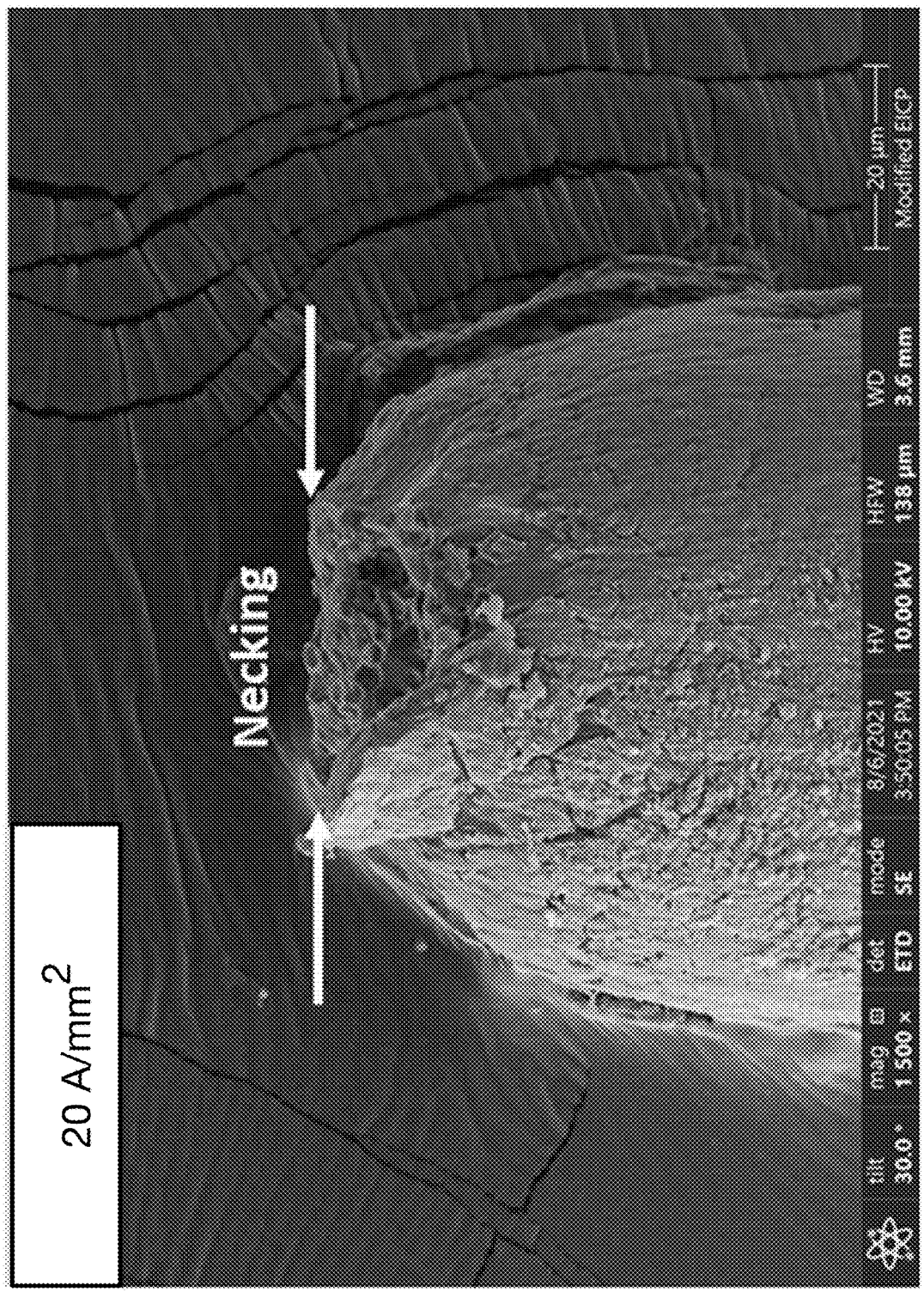

SEM images of the fractured Ti-6Al-4V wire with different electric current are shown in FIGS. 11A-11D. In FIG. 11A, shear fracture occurred at a 450 angle, and the dimple caused by the ductile fracture including void nucleating and growth, and coalescence was not observed at the fracture surface. However, a little amount of necking was shown at the right side of the failed wire, which is evidence of ductile fracture. On the other hand, when the current is applied, the fracture mode was dramatically changed as shown in FIGS. 11B-11D. A significant necking and diameter reduction happened, and cup-and-cone shaped fracture, which is typical of ductile fracture was observed. In addition, as shown in the high magnification image, lots of dimples were observed with less than 5 μm at the fracture surface. In the experiment with 20 A/mm$^2$ current density, more ductile deformation behavior was observed. Previously, conventional methods were used to study the brittle-to-ductile transition temperature (DBTT) of Ti-6Al-4V alloys via the Charpy test. It was reported that the DBTT was around 200° C. although DBTT depends on the specimen's orientation and post-process such as hot isostatic pressing. When considering the range of temperatures under the 0-20 A/mm$^2$ current density in FIG. 7b, the transition behavior in FIG. 11 could be explained by the DBTT. A sudden increase in localized ductility is likely associated with localized Joule heating at the necking due to locally focused current through the smaller cross-section of Ti-6Al-4V wire.

Figure 12A:
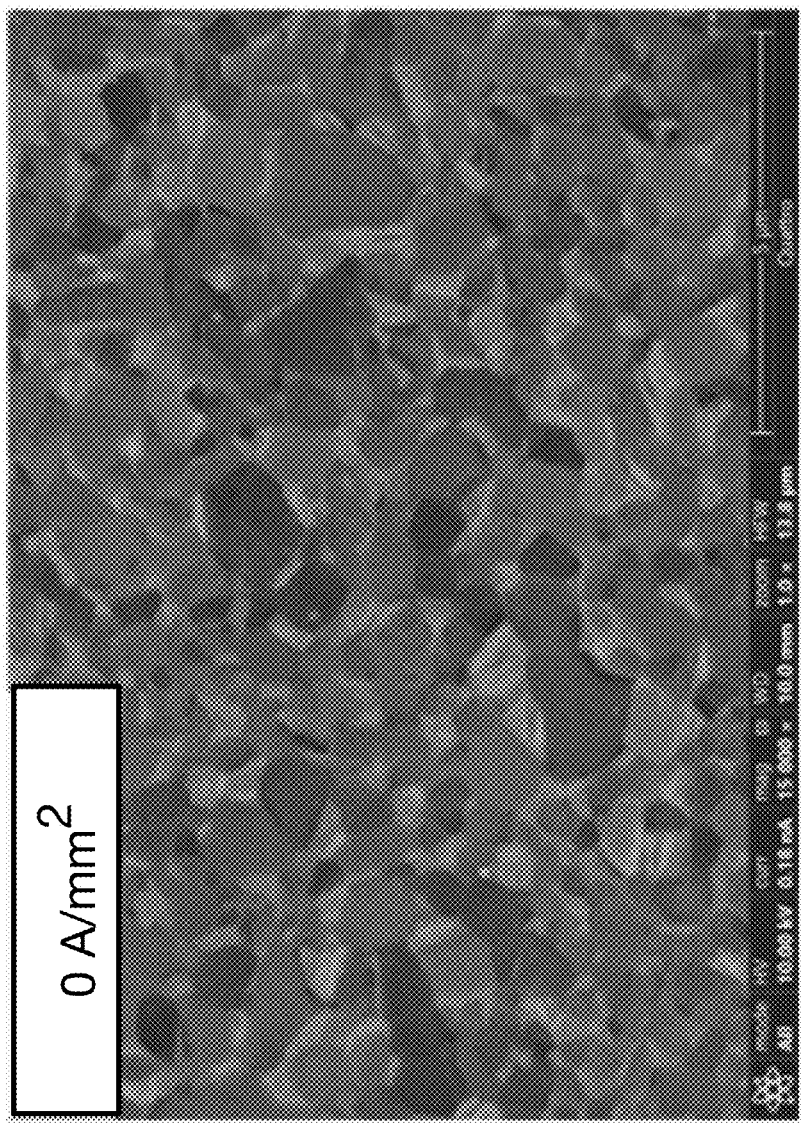
FIGS. 12A-12C are cross-sectional SEM images of Ti-6Al-4V wires after testing.
Figure 12B:
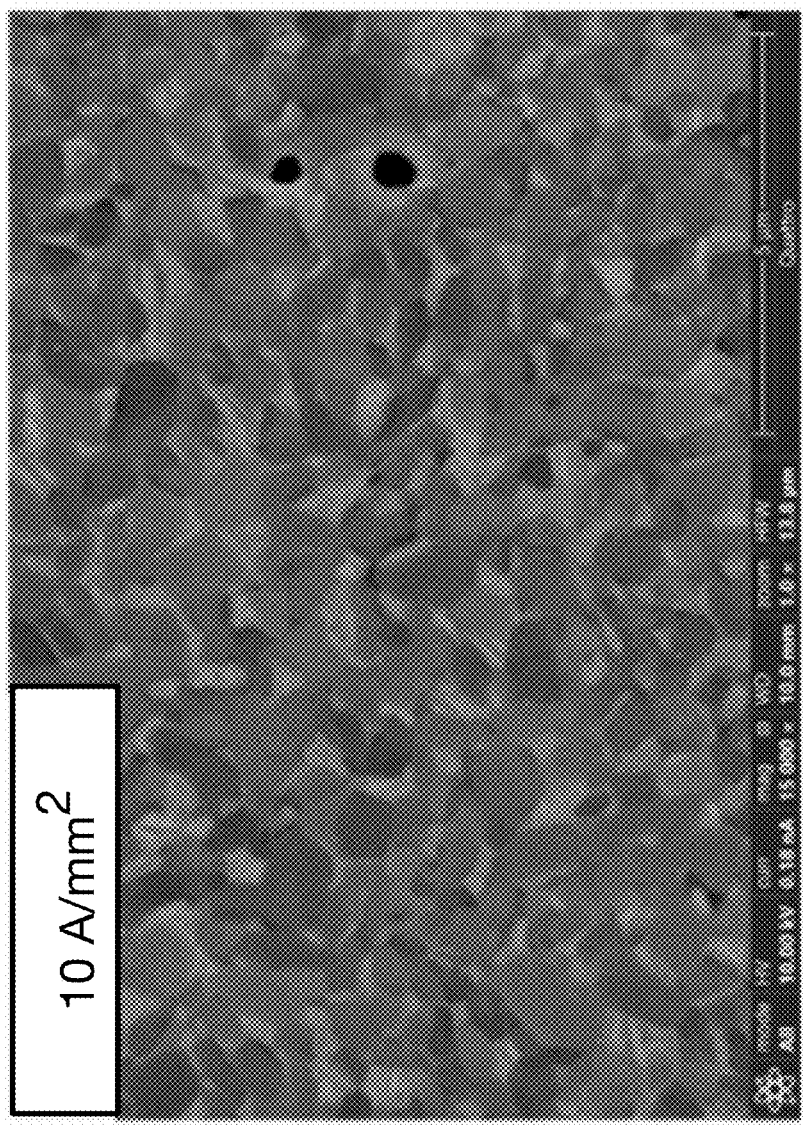
Figure 12C:
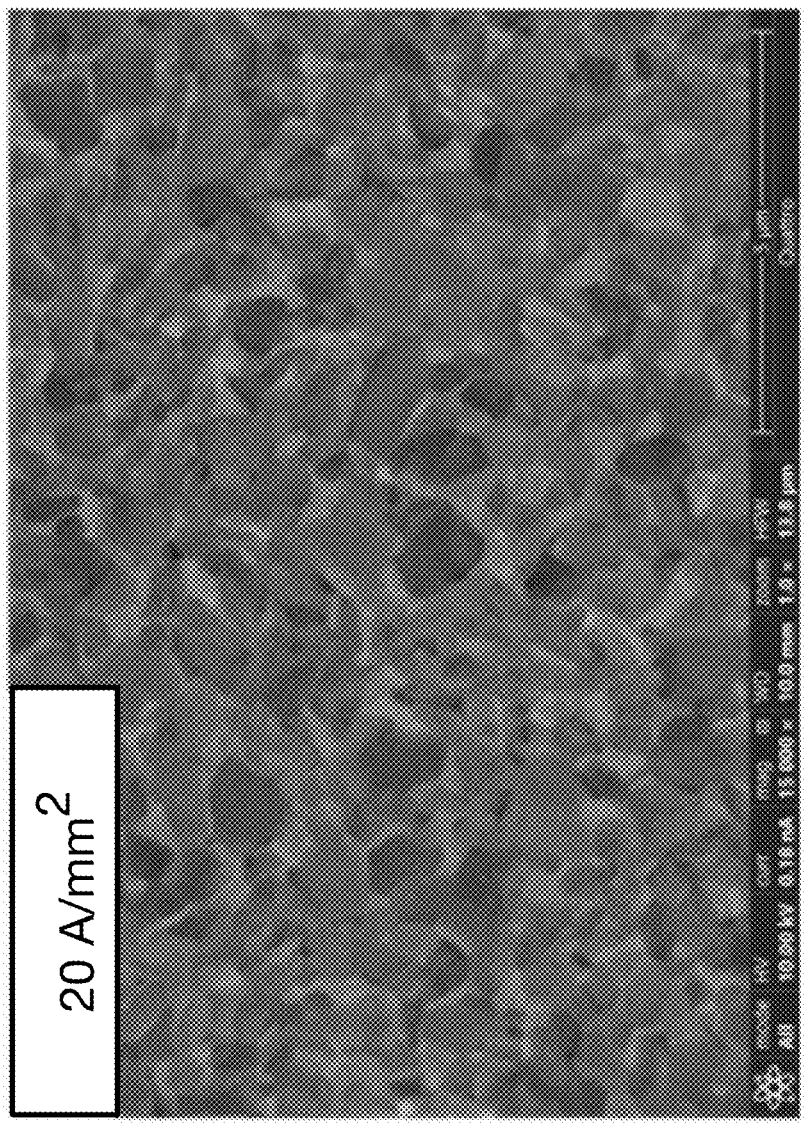

The experiment with 20 A/mm$^2$ current density appeared to have more ductile deformation behavior due to thermal effects. These results correspond well with the stress-strain curve in FIG. 9a. In addition, as shown in FIG. 9a and FIG. 10, the values of the ultimate tensile strength and fracture strength were not vastly different from each other, i.e., the fracture occurred soon after ultimate tensile strength. This behavior was caused by a rapid increase of current density $J=I/A_{CS}$, where J is current density, I is applied current, and $A_{cs}$ is cross-sectional area) in the fine wire due to the rapid reduction of its cross-sectional area after the onset of necking. In the specimen with 20 A/mm$^2$ current (FIG. 11d), the diameter of necking area was further reduced compared to the specimen with 10 A/mm$^2$, which means that the wire with 20 A/mm$^2$ current density underwent a rapid increase in current density during the plastic deformation. FIG. 12 is post-mortem cross-sectional SEM images of tested samples after electro-mechanical testing. The average grain size of samples under 0, 10, and 20 A/mm$^2$ is 382, 412, and 401 nm, respectively. Note that no obvious microstructural changes were observed in the post-mortem analysis because the temperature increase by the Joule heating was not significant compared to the melting point of Ti-6Al-4V alloys (1605-1660° C.). As a result, it can be concluded that the changes in the stress-strain responses can be explained by the thermal effect (i.e., Joule heating) without considering microstructural changes.

It is worth noting that accurate mechanical characterization becomes increasingly challenging with reduction of sample size (e.g., fine wires or thin sheets), because sample preparation/handling becomes non-trivial. In addition, displacement and force measurements require much higher resolution due to shorter gauge length and smaller cross section. According to various embodiments, the contemplated setup eliminates possible damage to specimen during the preparation of sample such as machining, loading, and alignment by using the 3D-printed sample holder. Additionally, based on the specification of the digital camera 122 in this specific embodiment (i.e., combined with a stereo microscope), the testing device 100 can measure around 350 nm displacement as minimum if the DIC method can detect the movement of a single pixel (≈3.5 μm/pixel), according to one embodiment. For force measurement, the electronic balance 120 of the specific embodiment has a 0.2 g (≈2.0 mN, ≈0.25 MPa for 100 μm diameter wire) resolution, and this makes it possible to measure the accurate force while the wire 110 is being deformed. For example, as shown in FIGS. 8A-8F, the displacement of the wire 110 was measured using the two pairs of tracking beads 124 (one is a pair of 1st and 3rd dots from the top and the other is 2nd and 4th), and their initial distance is about 3 mm. This means that the displacement change can be precisely detected based on the resolution of the device via the DIC method even in the elastic deformation region where the strain is below 1% in the experiment (FIG. 9). Furthermore, when considering the strength of Ti-6Al-4V materials, the stress resolution (~250 kPa) is adequate to obtain a reliable force value. As a result, it can be concluded that this particular, specific embodiment of the contemplated testing device 100 has an acceptable level of reliability for measuring the mechanical properties of small specimens such as fine wire.

In the experiments discussed above, using the specific embodiment of the testing device 100 and with electric current 138 ranging from 0 to 20 A/mm$^2$, it is noteworthy that elastic modulus and strength decrease with increasing current density while the maximum elongation of the wires 110 increases. These are caused by the applied current 138. The maximum elongation of the wire 110 subjected to 20 A/mm$^2$ current density increases by 38.8% compared to that of 0 A/mm$^2$. Similarly, the yield strength also decreases by 18.2% from 0 to 20 A/mm$^2$. In the case of elastic modulus, there was little change between the wire samples 110 with 0 and 10 A/mm$^2$ current density. However, the elastic modulus of wire 110 with 20 A/mm$^2$ current density was lower compared to the others.

To distinguish the thermal and athermal effects in this experiment, previous studies of the thermo-mechanical test can be compared, which means research for characterization of Ti-6Al-4V alloys depends on the temperature without any current. Considering the estimated temperature of 20 A/mm$^2$ specimen in this experiment (220° C.), the study with similar temperature range from 150 to 300° C. was investigated, and its result was summarized in FIG. 13. When considering the reduction ratio of yield and ultimate tensile strength of the results in this work, it was not significantly different from that of previous research. In other words, the result of the electro-thermo-mechanical test discussed above had similar behavior to elevated temperature thermo-mechanical experiments without any current 138. It can be concluded that the thermal effect becomes dominant between 10 and 20 A/mm$^2$ current density. In elastic modulus, the value in the present work was smaller compared to other research. However, when the level of reduction in elastic modulus of this and other previous research with similar test temperature was calculated, they had a similar tendency of elastic modulus reduction. Especially, in the study by Chen et al. [10], which conducted tensile tests (3rd row of elastic modulus in FIG. 13), the ratio of reduction in the result was quite similar, i.e., the drop of elastic modulus was affected only by the thermal effect, not the electrical current effect (electroplasticity). Kim et al. [5] reported that the elastic modulus affected by only thermal effect ($E_{thermal}$) was higher than the elastic modulus affected by both thermal and athermal effects ($E_{thermal+athermal}$) because of the charge imbalance at grain boundary. This imbalance made atomic bonding of metal weaken and caused the drop of elastic modulus. However, charge imbalance under the applied current, specifically under the 20 A/mm$^2$, was not observed in the work disclosed above based on the comparison between present work with electro-thermo-mechanical tensile test and other works with thermo-mechanical tests.

Figure 9B:
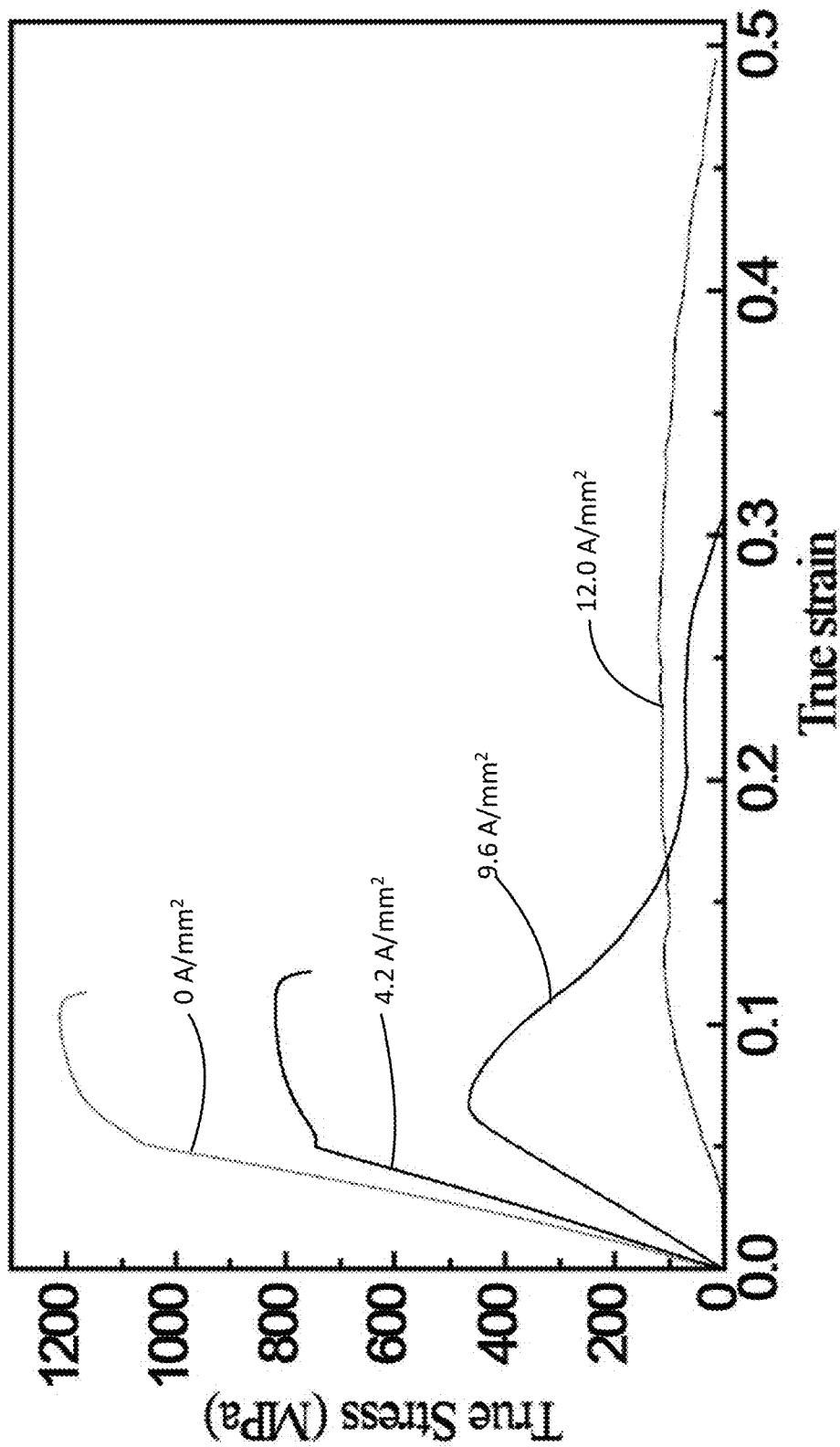

Li et al. [7] studied the tensile properties of Ti-6Al-4V sheet with pulsed current, and their strain-stress curve is reproduced in FIG. 9b. When current was applied to the sheet, softening was observed through the strain-stress curve. However, the amount of softening is significantly different when the stress-strain curves are compared. For example, the specimen with 9.6 A/mm$^2$ current density has much lower ultimate strength and much larger elongation compared to that with 10 A/mm in the present disclosure (see FIG. 9a). In addition, Ross et al. [6] reported comparable results that the significant deformation of Ti-6Al-4V specimen was observed under the applied DC current. In his previous research, ultimate tensile strength of the specimen without current is around 850 MPa at the 5-6% strain region. On the other hand, when the current of 12.6 A/mm$^2$ was applied on the specimen, its maximum strength decreased dramatically below the 300 MPa and the amount of strain at failure point also decreased. Compared to the results discussed above, it can be concluded that this dramatic difference is the direct result of the Joule heating caused by the dimensions of the specimens. When the dimensions in this experiment (i.e., wire with 100 μm diameter and 1 cm length), Li's (dog bone shape specimen with 0.5 mm thickness, 25 mm length, and 6 mm width), and Ross' (cylindrical specimen with 7.95±0.03 mm diameter and 76.7±0.3 mm length) are considered, the differences can be explained by differences in convective cooling rate during the test due to the surface-to-volume ratios as shown in FIG. 4. According to this temperature profile, the thermal effect will be reduced significantly with the decreased dimensions of the specimen. Furthermore, for the Ti-6Al-4V alloys which is composed of a and R phases, it is difficult to ignore the microstructural effect during electrically-assisted deformation because of the Joule heating under the current.

While the effects of localized Joule heating and thermal phonon have been reported as possible underlying mechanisms in EAD, the experimental results obtained with this specific, non-limiting example of the contemplated device and method strongly suggest that these are unlikely the main mechanisms for Ti-6Al-4V under these experimental conditions. First, 100-μm diameter is still exceptionally large compared to microstructural features of Ti-6Al-4V including grain size and dislocation length and, therefore, size dependent material behavior is very unlikely (e.g., the stress-strain curves in FIG. 9a and the resultant mechanical properties in FIG. 10 consistent with bulk material properties). Based on this argument, it is expected that the effect of localized Joule heating from grain boundary and dislocation pile-up on these samples would be compatible to bulk scale samples. Second, the sample examined above is smaller than a conventional sample and hence larger heat flux is expected in both radial and axial directions, which will result in larger phonon drag force. Despite localized Joule heating and larger drag force based on the arguments above, no electroplasticity beyond the thermal effect has been observed. Therefore, localized Joule heating and phonon drag are unlikely to be the dominant deformation mechanisms for Ti-6Al-4V alloys at 20 A/mm$^2$ or smaller current density.

It will be understood that embodiments are not limited to the specific components disclosed herein, as virtually any components consistent with the intended operation of a device and/or method for the electro-thermo-mechanical characterization of microscale wires may be utilized. Accordingly, for example, although particular devices and components may be disclosed, such components may comprise any shape, size, style, type, model, version, class, grade, measurement, concentration, material, weight, quantity, and/or the like consistent with the intended operation of a device and/or method for the electro-thermo-mechanical characterization of microscale wires may be used. In places where the description above refers to particular implementations of a device and/or method for the electro-thermo-mechanical characterization of microscale wires, it should be readily apparent that a number of modifications may be made without departing from the spirit thereof and that these implementations may be applied to other characterization methods and devices. Accordingly, the disclosed subject matter is intended to embrace all such alterations, modifications and variations that fall within the spirit and scope of the disclosure and the knowledge of one of ordinary skill in the art.

REFERENCES

[1] Z. Xu, G. Tang, S. Tian, F. Ding, H. Tian, Research of electroplastic rolling of AZ31 Mg alloy strip, J. Mater. Process. Technol. 182 (1-3) (2007) 128-133.

[2] C. R. Green, T. A. McNeal, J. T. Roth, Springback elimination for Al-6111 alloys using electrically assisted manufacturing (EAM), 37th annual north American manufacturing research conference, NAMRC 37 (2009) 403-410.

[3] C. D. Ross, D. B. Irvin, J. T. Roth, Manufacturing aspects relating to the effects of direct current on the tensile Properties of metals, J. Eng. Mater. Technol. 129 (2) (2007) 342-347.

[4] H.-D. Nguyen-Tran, H.-S. Oh, S.-T. Hong, H. N. Han, J. Cao, S.-H. Ahn, D.-M. Chun, A review of electrically-assisted manufacturing, International Journal of Precision Engineering and Manufacturing-Green Technology 2 (4) (2015) 365-376.

[5] M.-J. Kim, S. Yoon, S. Park, H.-J. Jeong, J.-W. Park, K. Kim, J. Jo, T. Heo, S.-T. Hong, S. H. Cho, Y.-K. Kwon, I.-S. Choi, M. Kim, H. N. Han, Elucidating the origin of electroplasticity in metallic materials, Appl. Mater. Today 21 (2020), 100874.

[6] C. D. Ross, T. J. Kronenberger, J. T. Roth, Effect of dc on the formability of Ti-6Al-4V, J. Eng. Mater. Technol. 131 (3) (2009).

[7] X. Li, Q. Zhou, S. Zhao, J. Chen, Effect of pulse current on bending behavior of Ti6Al4V alloy, Procedia Engineering 81 (2014) 1799-1804.

[8] J. Yi, W. Zhou, Z. Deng, Experimental study and numerical simulation of the intermittent feed high-speed grinding of TC4 titanium alloy, Metals-Basel 9 (7) (2019) 802.

[9] S. Y. Hong, I. Markus, W.-C. Jeong, New cooling approach and tool life improvement in cryogenic machining of titanium alloy Ti-6Al-4V, Int. J. Mach. Tools Manuf. 41 (15) (2001) 2245-2260.

[10] C. Chen, H. Zhu, Z. Xiao, S. Liu, J. Yin, X. Zeng, The residual stress distribution of Ti-6Al-4V thin wall in the selective laser melting, in: IOP Conference Series: Materials Science and Engineering, IOP Publishing, 2019, p. 012020.

[11] N. K. Babu, S. G. S. Raman, R. Mythili, S. Saroja, Correlation of microstructure with mechanical properties of TIG weldments of Ti-6Al-4V made with and without current pulsing, Mater. Charact. 58 (7) (2007) 581-587.

[12] B. Baufeld, O. Van der Biest, Mechanical properties of Ti-6Al-4V specimens produced by shaped metal deposition, Sci. Technol. Adv. Mater. 10 (1) (2009) 015008.

[13] P. Rangaswamy, High Temperature Stress Assessment in SCS-6/TI-6Al-4V Composite Using Neutron Diffraction and Finite Element Modeling, Los Alamos National Lab, Los Alamos, NM (US), 2000.

What is claimed is:

1. An electro-thermo-mechanical tensile testing device for wires, comprising:
    a sample frame comprising an upper part and a lower part, with the upper part coupled to the lower part through a plurality of sacrificial supports that are integral with the upper part and the lower part, the upper part and the lower part each comprising an electrical contact pad and at least one protrusion, wherein the upper part and the lower part are electrically non-conductive, and the sample frame is 3D printed;
    a wire sample comprising a plurality of tracking beads, the wire sample affixed to the upper part and the lower part such that the electrical contact pad of the upper part is communicatively coupled to the electrical contact pad of the lower part through the wire sample, with the wire sample wrapped around at least one protrusion on each of the upper part and the lower part;
    a piezo actuator coupled to the upper part;
    a weight of known mass coupled to the lower part;
    a DC power supply communicatively coupled to the wire sample through the electrical contact pads of the upper part and the lower part, the DC power supply configured to pass a current through the wire sample;
    an electronic balance positioned beneath the weight, with the weight resting on the electronic balance; and
    a digital camera pointed at the wire sample within the sample frame such that the tracking beads on the wire sample are visible;
    wherein the digital camera and the electronic balance are configured such that images are captured and weight measurements are recorded simultaneously, at regular intervals, while testing is being performed.

2. The device of claim 1, further comprising:
    a first vessel containing water, the first vessel positioned on top of the electronic balance; and
    a second vessel placed on the water inside the first vessel;
    wherein the weight is sitting on the second vessel, floating on the water of the first vessel, self-aligning with the sample frame and eliminating unwanted horizontal forces.

3. The device of claim 1, wherein the wire sample is affixed to the sample frame with an adhesive.

4. The device of claim 1, further comprising a box enclosing the piezo actuator, the electronic balance, and the sample frame.

5. An electro-thermo-mechanical tensile testing device for wires, comprising:
    a sample frame comprising an upper part and a lower part, with the upper part coupled to the lower part through a plurality of sacrificial supports, the upper part and the lower part each comprising an electrical contact pad, wherein the upper part and the lower part are electrically non-conductive;
    a wire sample comprising a plurality of tracking beads, the wire sample affixed to the upper part and the lower part such that the electrical contact pad of the upper part is communicatively coupled to the electrical contact pad of the lower part through the wire sample;
a piezo actuator coupled to the upper part;
a weight of known mass coupled to the lower part;
a DC power supply communicatively coupled to the wire sample through the electrical contact pads of the upper part and the lower part, the DC power supply configured to pass a current through the wire sample;
an electronic balance positioned beneath the weight, with the weight resting on the electronic balance; and
a digital camera pointed at the wire sample within the sample frame such that the tracking beads on the wire sample are visible.

6. The device of claim 5, further comprising:
a first vessel containing water, the first vessel positioned on top of the electronic balance; and
a second vessel placed on the water inside the first vessel;
wherein the weight is sitting on the second vessel, floating on the water of the first vessel, self-aligning with the sample frame and eliminating unwanted horizontal forces.

7. The device of claim 5, wherein the upper part and the lower part each comprise at least one protrusion around which the wire sample is wrapped.

8. The device of claim 5, wherein the wire sample is affixed to the sample frame with an adhesive.

9. The device of claim 5, wherein the sacrificial supports are integral with the upper part and the lower part of the sample frame.

10. The device of claim 5, wherein the sample frame is 3D printed.

11. The device of claim 5, wherein the wire sample is communicatively coupled to the electrical contact pads through a conductive paste.

12. The device of claim 5, further comprising a box enclosing the piezo actuator, the electronic balance, and the sample frame.

13. A method for the thermo-electro-mechanical characterization of wires, comprising:
affixing a wire sample to a sample frame, the sample frame comprising a plurality of sacrificial supports connecting an upper part of the sample frame with a lower part of the sample frame, the upper part and the lower part each being electrically non-conductive and each comprising an electrical contact pad, wherein the wire sample is affixed to the sample frame such that the electrical contact pad of the upper part is communicatively coupled to the electrical contact pad of the lower part through the wire sample;
coupling the upper part of the sample frame to a piezo actuator above the sample frame;
coupling the lower part of the sample frame to a weight of known mass below the sample frame, the weight located on an electronic balance;
communicatively coupling the wire sample to a DC power supply through the electrical contact pads of the sample frame;
destroying the sacrificial supports, making the wire sample the only connection between the upper part and the lower part;
applying a desired current to the wire sample using the DC power supply;
waiting for thermal changes in the wire sample due to Joule heating from the applied current to reach a steady state;
applying a force on the wire sample by displacing the upper part of the sample frame upward using the piezo actuator;
simultaneously capturing images of tracking beads on the wire sample with a digital camera and weight measurements from the electronic balance, at regular intervals while the upper part is being displaced upward, until the wire sample fails; and
determining stress values and strain values using the captured images and weight measurements.

14. The method of claim 13, wherein destroying the sacrificial supports comprises melting the sacrificial supports.

15. The method of claim 13:
wherein the upper part and the lower part each comprise at least one protrusion; and
wherein affixing the wire sample to the sample frame comprises wrapping the wire sample around at least one protrusion on each of the upper part and the lower part of the sample frame.

16. The method of claim 13, further comprising fabricating the sample frame using 3D printing, with the sacrificial supports made integral with the upper part and the lower part.

17. The method of claim 13:
wherein the weight of known mass being coupled to the lower part of the sample frame is sitting in a second vessel, the second vessel floating on water contained in a first vessel, the first vessel located on top of the electronic balance, such that the weight self-aligns with the sample frame, eliminating unwanted horizontal forces.

18. The method of claim 13, wherein affixing the wire sample to the sample frame comprises bonding the wire sample to the upper part and the lower part with an adhesive.

19. The method of claim 13, wherein affixing the wire sample to the sample frame comprises communicatively coupling the wire sample to the electrical contact pads using a conductive paste.

20. The method of claim 13, wherein determining the strain values comprises using digital image correlation.

* * * * *